US007215353B2

(12) United States Patent
Maeda

(10) Patent No.: US 7,215,353 B2
(45) Date of Patent: May 8, 2007

(54) METHOD AND APPARATUS FOR IMAGE FORMING CAPABLE OF EFFECTIVELY CONTROLLING A LIGHT BEAM WITH A PULSE WIDTH MODULATION

(75) Inventor: Katsuhiko Maeda, Kanagawa-ken (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/147,867

(22) Filed: May 20, 2002

(65) Prior Publication Data

US 2003/0001945 A1    Jan. 2, 2003

(30) Foreign Application Priority Data

May 18, 2001 (JP) ............................. 2001-149731

(51) Int. Cl.
*B41J 2/47* (2006.01)
(52) U.S. Cl. .................. 347/240; 347/251; 347/252
(58) Field of Classification Search ........ 347/239–240, 347/251–255, 144, 142, 224, 131–132, 236, 347/246, 183–184, 237, 247; 382/199; 399/66
See application file for complete search history.

(56) References Cited

U.S. PATENT DOCUMENTS 4,873,537 A * 10/1989 Ohta ........................ 347/252
4,987,426 A * 1/1991 Ota et al. .................. 347/253

5,170,403 A    12/1992 Mayer ........................ 372/26

(Continued)

FOREIGN PATENT DOCUMENTS

EP    0 126 782    12/1984

(Continued)

OTHER PUBLICATIONS

U.S. Appl. No. 10/147,867, filed May 20, 2002, Maeda.

(Continued)

*Primary Examiner*—Hai Pham
(74) *Attorney, Agent, or Firm*—Oblon, Spivak, McClelland, Maier & Neustadt, P.C.

(57) ABSTRACT

An image forming apparatus includes a modulation data storage, a pulse width modulator, and an optical writing mechanism. The modulation data storage stores different gray-scale pulse sets. Each set includes gray-scale pulses having pulse widths different from each other in steps of a predetermined value corresponding to gray-scale information possibly contained in image data to be input. Each gray-scale pulse includes at least two pulses including at least one of left-positioned and right-positioned pulses. The pulse width modulator selects a gray-scale pulse set from among the different gray-scale sets in accordance with gray-scale information and performs a pulse width modulation to control a light beam on and off at a density twice or more than twice a density of the input image data by using the gray-scale pulse set selected. The optical writing mechanism causes the light beam to scan a photosensitive member to form a latent image thereon.

48 Claims, 14 Drawing Sheets

U.S. PATENT DOCUMENTS

| | | | |
|---|---|---|---|
| 5,371,524 A | * 12/1994 | Herczeg et al. | 347/224 |
| 5,761,573 A | * 6/1998 | Haneda et al. | 399/66 |
| 5,862,257 A | * 1/1999 | Sekine et al. | 382/199 |
| 5,933,255 A | 8/1999 | Hirata et al. | 358/501 |
| 6,014,161 A | * 1/2000 | Hirst et al. | 347/252 |
| 6,184,916 B1 | * 2/2001 | Cianciosi | 347/255 |
| 2003/0001945 A1 | 1/2003 | Maeda | |

FOREIGN PATENT DOCUMENTS

| | | |
|---|---|---|
| FR | 2 253 338 | 6/1975 |
| JP | 60243649 A * | 12/1985 |
| JP | 08-18782 | 1/1996 |

OTHER PUBLICATIONS

Pending U.S. Appl. No. 10/618,733, filed Jul. 15, 2003, Maeda.
U.S. Appl. No. 10/785,154, filed Feb. 25, 2004, Maeda.
U.S. Appl. No. 11/036,025, filed Jan. 18, 2005, Maeda.
U.S. Appl. No. 11/334,592, filed Jan. 19, 2006, Maeda.

* cited by examiner

METHOD AND APPARATUS FOR IMAGE FORMING CAPABLE OF EFFECTIVELY CONTROLLING A LIGHT BEAM WITH A PULSE WIDTH MODULATION

BACKGROUND OF THE INVENTION

1. Field of the Invention

The present invention relates to a method and apparatus for image forming, and more particularly to a method and apparatus for image forming that is capable of effectively performing a light beam with a pulse width modulation using various gray-scale pulses.

2. Discussion of the Background

Conventionally, electrophotographic is widely applied to an image forming apparatus such as a laser printer using a semiconductor laser. In this apparatus, the laser light beam is deflected with a polygon mirror to scan a surface of a photosensitive member, thereby forming a latent image of an object image.

As an example of this type of apparatus, Japanese unexamined patent application publication No. 08-018782 describes a multiple color information recording apparatus attempting to improve an image quality with a pulse width modulation (PWM) method. The PWM method controls a time period defined as a duty of an on-time of a laser diode.

Also, a technique is known which improves an image quality by increasing a recording resolution. In this technique, a laser diode is driven to emit laser light at a density more than twice an input image density, or a number of input pixels, in at least one of the main scanning and sub-scanning directions. In recent years, this technique is widely used to improve the image quality, in which the recording is performed at such a high resolution with a reduction of a number of gray-scale included in image data.

Generally, a dither method and an error diffusion method are used for a case where a gray-scale is expressed with binary image data, for example. The PWM method can also be used for such case. In the PWM method, a pulse is predefined with a certain width and a dot is formed using this pulse. In order to obtain a superior image quality, it is needed to select a pulse having the most preferable width.

The PWM method can also be used for a case where a gray-scale is expressed with image data of a multiple value such as a four-stepped-value, an eight-stepped-value, and so forth. In the multiple value, the four-stepped-value has three levels of data, the eight-stepped-value has seven levels of data, and so forth. To each of these levels of data included in each multiple value, a pulse is predefined with a width. In this case, it is also needed to select a pulse having the most preferable width so as to obtain a superior image quality.

A free selection of pulses is preferable to obtain a pulse having the most suitable width. However, it is difficult to predefine a pulse width by dividing it into relatively small steps, which increases a manufacturing cost, particularly in a case where a recording is performed at a relatively high resolution and at a relatively fast recording speed.

Therefore, in an apparatus that generates, for example, eight different pulses including one-eighth, two-eighth, three-eighth, four-eighth, five-eighth, six-eighth, seven-eighth, and eight-eighth, a pulse having the most suitable width is required to be selected from among these eight different pulses relative to the data of each gray-scale. As a result, it produces a drawback that an image quality is not optimized.

In recent years, a red laser diode having a 650-nm-ranged wave length that is capable of reducing a spot size has been used as a light source in place of a laser diode of a 780-nm-ranged wave length to be able to perform a recording at a high resolution. However, this red laser diode has a characteristic that, as illustrated in FIG. 11, a start of an actual light emission indicated by a signal S2 is delayed relative to a signal indicated by a signal S1 for commanding the laser diode to start emitting laser light. Accordingly, laser light needed may not be obtained when the width of a pulse is predefined without adjusting the above-mentioned time delay. Consequently, this causes a problem that an image quality is degraded.

Actually, when a recording is performed with a red laser diode, the pulses having widths at relatively low duty ratios are not usable depending upon a recording resolution or a recording speed. This leads to a problem that the narrow selection becomes more narrow.

The above-mentioned Japanese unexamined patent application publication No. 08-018782 describes a multiple color information recording apparatus capable of selecting a method of growing pulses with the pulse width modulation in accordance with input data and values of the neighboring pixels. Such an apparatus can select the positions of pulses but not solve the above-mentioned problem of the narrowed selection.

SUMMARY OF THE INVENTION

This patent specification describes a novel image forming apparatus that uses a pulse width modulation for controlling a scanning light beam in an optical writing system. In one example, a novel image forming apparatus includes a photosensitive member, a modulation data storage, a pulse width modulator, and an optical writing mechanism. The photosensitive member is written a latent image on a surface thereof. The modulation data storage stores a plurality of different gray-scale pulse sets. Each of the plurality of different gray-scale sets includes a plurality of gray-scale pulses having pulse widths different from each other in steps of a predetermined value which corresponds to gray-scale information including a plurality of gray-scale values possibly contained in image data to be input. Each of the plurality of gray-scale pulses is made of a combination of at least two pulses including at least one of left-positioned and right-positioned pulses. The pulse width modulator selects a gray-scale pulse set from among the plurality of different gray-scale sets stored in the modulation data storage in accordance with gray-scale information contained in input image data and performs a pulse width modulation to control a light beam on and off in accordance with the input image data at a density twice or more than twice a density of the input image data by using the gray-scale pulse set selected. The optical writing mechanism causes the light beam to scan the photosensitive member so as to form a latent image on the photosensitive member in accordance with the input image data.

The pulse width modulator may control the light beam on and off at a density twice a density of the input image data in a main scanning direction, or in a sub-scanning direction, or in both main scanning and sub-scanning directions.

Each gray-scale pulse included in the gray-scale pulse set may be made of a combination of a right-positioned pulse and a left-positioned in this order.

An input mechanism may be included for inputting information to predefine or to change each gray-scale pulse included in a gray-scale pulse set prestored in the modulation data storage.

A source of the light beam may be a red laser diode having a 650-nm-ranged wave length.

The pulse width modulator in turn may perform the pulse width modulation for the input image data of yellow, magenta, cyan, and black colors. Also, the optical writing mechanism may in turn form the latent image of yellow, magenta, cyan, and black colors on the photosensitive member in accordance with the input image data of yellow, magenta, cyan, and black colors, respectively, by causing the light beam to scan the photosensitive member. In this case, the light beam is in turn controlled in accordance with the input image data of yellow, magenta, cyan, and black colors, respectively.

The predetermined value may be a one-eighth of a pixel of the image data to be input.

This patent specification further describes a novel method of image forming that uses a pulse width modulation for controlling a scanning light beam in an optical writing system. In one example, a novel method includes the steps of storing, entering, selecting, performing, and controlling. The storing step stores a plurality of different gray-scale pulse sets. Each of the plurality of different gray-scale sets includes a plurality of gray-scale pulses having pulse widths different from each other in steps of a predetermined value in accordance with gray-scale information including a plurality of gray-scale values possibly contained in image data to be input. Each of the plurality of gray-scale pulses is made of a combination of at least two pulses including at least one of a left-positioned pulse and a right-positioned pulse. The entering step enters input image data. The selecting step selects a gray-scale pulse set from among the plurality of different gray-scale sets in accordance with gray-scale information contained in the input image data entered by the entering step. The performing step performs a pulse width modulation using gray-scale pulses included in the gray-scale pulse set selected by the selecting step to control a light beam on and off in accordance with the input image data at a density twice or more than twice a density of the input image data entered by the entering step. The controlling step controls the light beam to scan a photosensitive member to form a latent image on the photosensitive member in accordance with the input image data entered by the entering step.

The performing step may perform the pulse width modulation to control the light beam on and off at a density twice or more than twice a density of the input image data in a main scanning direction, or in a sub-scanning direction, or in both main scanning and sub-scanning directions.

Each gray-scale pulse included in the gray-scale pulse set may be made of a combination of a right-positioned pulse and a left-positioned in this order.

The above-mentioned method may further include a step of inputting information to predefine or to change each gray-scale pulse of the plurality of gray-scale pulse sets prestored by the storing step.

A source of the light beam may be a red laser diode having a 650-nm-ranged wave length.

The selecting step may select a suitable gray-scale pulse set from among the plurality of different gray-scale sets in accordance with gray-scale information contained in each of yellow, magenta, cyan, and black color image data included in the input image data entered by the entering step each time one of the yellow, magenta, cyan, and black color image data is processed one after another. In this case, the performing step performs the pulse width modulation using gray-scale pulses included in the suitable gray-scale pulse set selected by the selecting step to control the light beam on and off in accordance with each of the yellow, magenta, cyan, and black color image data. Then, the controlling step controls the light beam to scan a photosensitive member to form a latent image on the photosensitive member in accordance with gray-scale information contained in each of yellow, magenta, cyan, and black color image data included in the input image data entered by the entering step each time one of the yellow, magenta, cyan, and black color image data is processed one after another.

The predetermined value may be a one-eighth of a pixel of the image data to be input.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
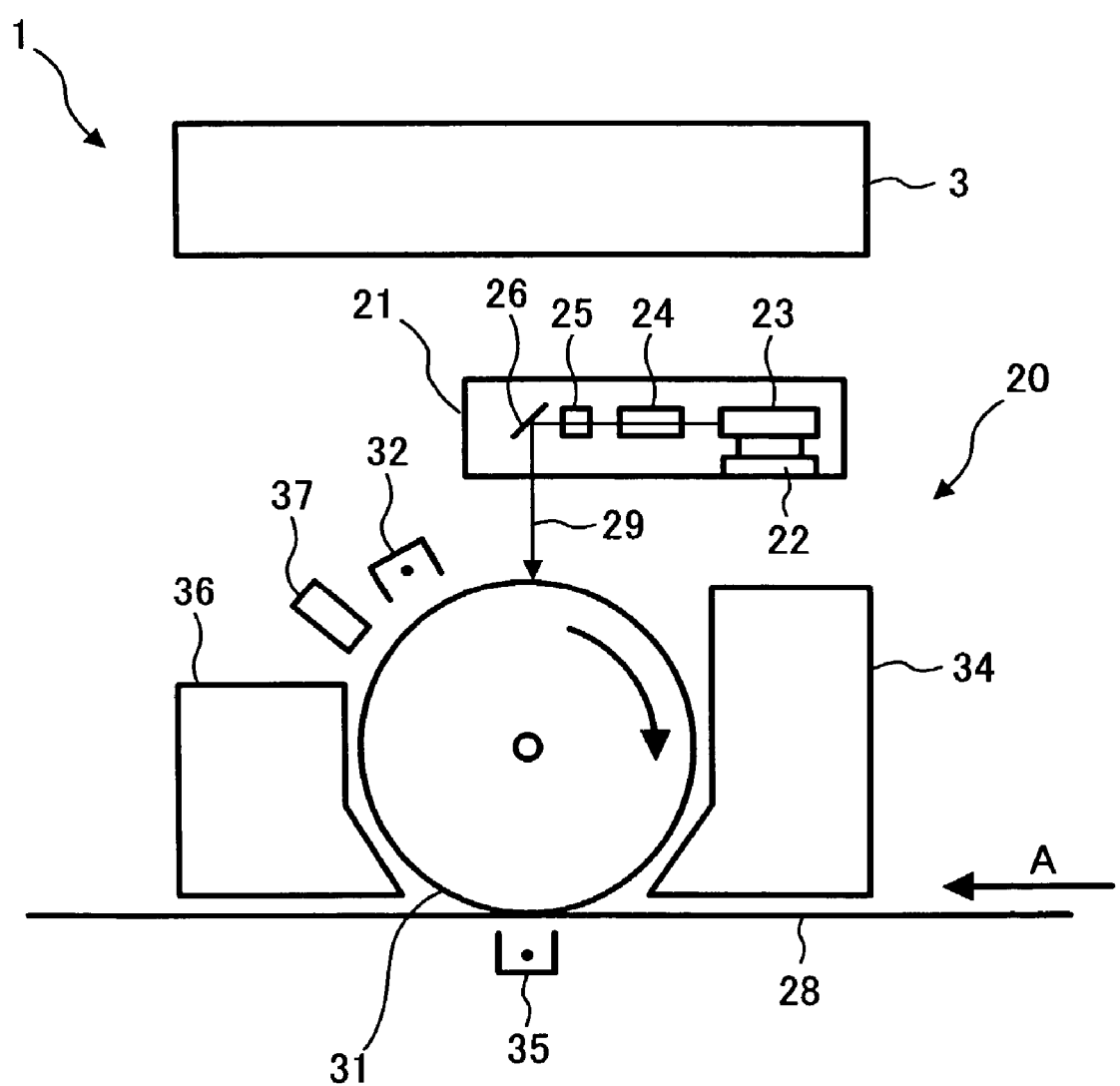
FIG. 1 is a schematic block diagram for explaining an image forming apparatus according to an embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a description is made for an electrophotographic image forming apparatus 1 according to a preferred embodiment of the present invention. This image forming apparatus 1 is provided with a laser writing system 20 that employs an LD (laser diode) controlled to emit a laser beam in accordance with image data obtained from an original document through an image reading unit 3 for optically reading an image and that writes an image on a photosensitive member with the laser beam. FIG. 1 illustrates the image forming apparatus 1, particularly focusing on the laser writing system 20 thereof. As shown in FIG. 1, the laser writing system 20 of the image forming apparatus 1 includes a photosensitive drum 31, a charging unit 32, an optical unit 21, a development unit 34, a transfer unit 35, a cleaning unit 36, and a discharging unit 37. The photosensitive drum 31 is provided as an image carrying member on which an object image to be formed is drawn in a form of a latent image. That is, the photosensitive drum 31 is charged by the charging unit 32 and is then exposed to a light beam 29 emitted from the optical unit 21 so that a latent image is written on the photosensitive drum 31.

The optical unit 21 is provided as a means of optically writing image information. In the optical unit 21, a laser beam emitted from an LD (laser diode) unit 27 (see FIG. 2) provided as a light source is converted into parallel light rays with a collimate lens (not shown). Then, after passing through a cylinder lens (not shown), the parallel light rays are deflected by a polygon mirror 23 rotated at a relatively high speed with a polygon motor 22. Further, the parallel light rays are subjected to a sub-scanning direction focusing through an fθ lens 24 and a barrel toroidal lens (BTL) 25. With this sub-scanning direction focusing, a light gathering and a positional correction in the sub-scanning direction are performed. After the sub-scanning direction focusing, the parallel light rays are reflected by a mirror 26 and become the laser beam 29 which scans the surface of the photosensitive drum 31.

The LD unit 27 provided to the optical unit 21 is controlled in accordance with image data transferred from a frame memory or the image reading unit, both not shown. This control will be explained later.

The development unit 34 is provided as a unit for visualizing the latent image formed on the surface of the photosensitive drum 31 with toner, and the transfer unit 35 transfers the visualized image onto a recording sheet 28.

The cleaning unit 36 is a unit for removing a residual toner remaining unused through a transfer process, the discharging unit 37 discharges electronic charges from the photosensitive drum 31, and the charging unit 32 evenly charges the discharged surface of the photosensitive drum 31.

With the above-mentioned units, the image forming apparatus 1 of the present invention performs the series of common electrophotographic processes including charging, exposing, developing, transferring, cleaning, and discharging processes and, after causing a sheet supply unit (not shown) to feed a recording sheet 28, forms an image on the recording sheet 28 being transferred in a direction A with a transfer belt (not shown). The image formed on the recording sheet 28 is fixed by a fixing unit (not shown).

Figure 2:
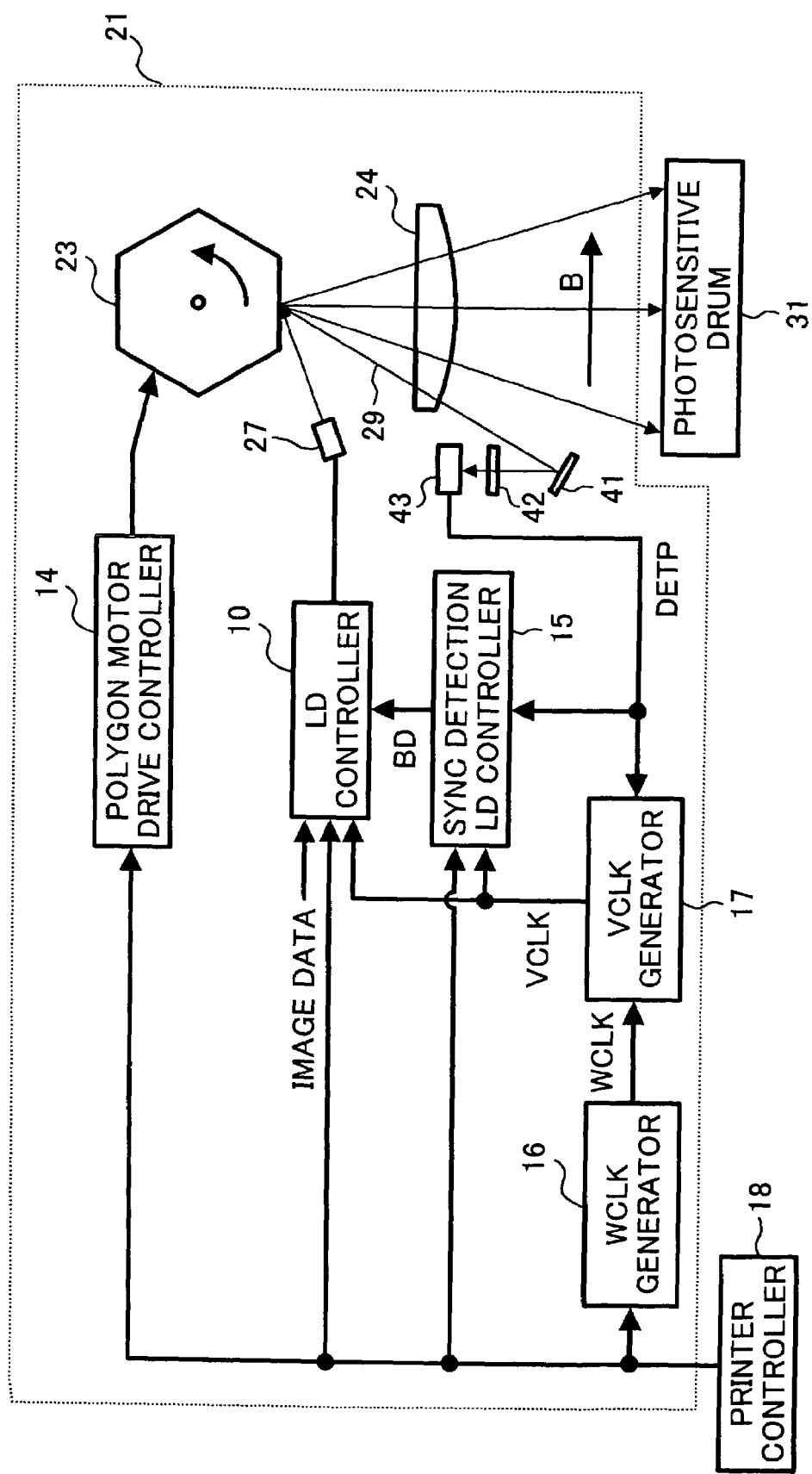
FIG. 2 is a schematic block diagram for explaining a laser writing system of the image forming apparatus of FIG. 1.

Next, a control circuit of the optical unit 21 is explained with reference to FIG. 2. As illustrated in FIG. 2, the optical unit 21 further includes an LD (laser diode) controller 10, a polygon motor drive controller 14, a sync detection LD (laser diode) controller 15, a write clock signal (WCLK) generator 16, a phase sync clock signal (VCLK) generator 17, a mirror 41, a lens 42, and a sync detection sensor 43. In FIG. 2, the polygon motor 22, the BTL 25, and the mirror 26 are omitted to be shown.

The sync detection sensor 43 is arranged at a position close to a starting edge of a delta-like-shaped scanning area in the main scanning direction. The sync detection sensor 43 is configured to receive the light beam 29 which passes through the fθ lens 24, is reflected by the mirror 41, and is brought to converge with the lens 42 before impinging on the sync detection sensor 43.

Upon receiving the light beam 29, the sync detection sensor 43 outputs a detection pulse (DETP) to the VCLK generator 17 and the sync detection LD controller 15. The VCLK generator 17 generates a phase sync clock signal VCLK in synchronism with the detection pulse DETP, based on the write clock signal WCLK generated by the WCLK generator 16 and the detection pulse DETP. The phase sync clock signal VCLK is sent to the LD controller 10 and the sync detection LD controller 15.

The sync detection LD controller 15 generates a beam drive signal BD in a high state in response to DETP and sends the beam drive signal BD to the LD controller 10 which uses the beam drive signal BD in a high state to turn on the laser diode of the LD unit 27. Initially, the sync detection LD controller 15 keeps the beam drive signal BD in a high state until receiving the first DETP so that the LD unit 27 is continuously driven to emit the light beam until the detection of the first DETP. After receiving the first DETP, the sync detection LD controller 15 sends the beam drive signal BD in a high state to the LD controller 10 based on the signals DETP and VCLK at a timing such that the signal DETP can securely be detected without generation of flare light.

The LD controller 10 controls the LD unit 27 to turn on in response to a width of a pulse signal which is generated from image data sent from the image reading unit or the frame memory in synchronism with the signals BD and VCLK. When the LD unit 27 turns on, it emits the laser light which, as described above, is converted into the laser beam 29 to scan the photosensitive drum 31.

The polygon motor drive controller 14 controls the polygon motor 22 to rotate at a predetermined rpm (revolutions per minute) using a control signal sent from a printer controller 18.

The printer controller 18 controls the operations of the laser writing system 20 of the image forming apparatus 1 using a control signal sent from a controller (not shown) for controlling the entire operations of the image forming apparatus 1.

Figure 3:
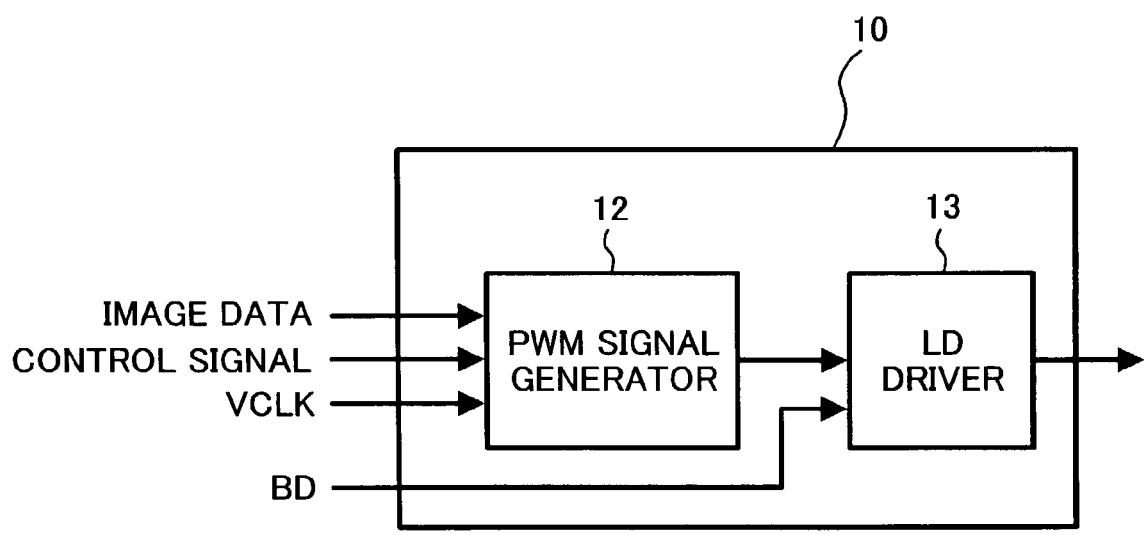
FIG. 3 is a schematic block diagram for explaining a laser diode controller of the laser writing system of FIG. 2.

The LD controller 10 is further explained in detail below. The LD controller 10 includes a pulse width modulator for controlling the light beam to go on and out using a pulse width modulation. As illustrated in FIG. 3, the LD controller 10 includes a PWM (pulse width modulation) signal generator 12 and an LD driver 13.

The PWM signal generator 12 includes a nonvolatile memory and is a modulation data storing means for storing various gray-scale pulses configured by combinations of right-positioned pulses and left-positioned pulses both having variations of various pulse widths, in response to each piece of gray-scale information included in image data, and by one of these right-positioned and left-positioned pulses. Also, in accordance with the gray-scale information included in the image data input, the PWM signal generator 12 selects and reads out a corresponding gray-scale pulse from among the gray-scale pulses stored, and sends it as a PWM signal to the LD driver 13.

The LD driver 13 drives the laser diode of the LD unit 27 to emit the light beam in accordance with the PWM signal sent from the PWM signal generator 12 or the beam drive signal BD sent from the sync detection LD controller 15. That is, the LD driver 13 causes the laser diode of the LD unit 27 to turn on in accordance with the gray-scale pulse or during a time of receiving the beam drive signal BD.

It should be noted that if the image data is binary data, having only on and off states, the PWM signal generator 12 outputs a stored predetermined gray-scale pulse when the image data is in an on state. This on state of the image data is regarded as a kind of gray-scale information. In this case, the gray-scale pulse may be selected in response to the control signal sent from the printer controller 18. Also, if the image data is multi-valued data, the gray-scale pulse corresponding to each of the gray-scale information may be altered by the control signal sent from the printer controller 18.

Next, an example of the gray-scale pulse used in the image forming apparatus 1 is explained. The image forming apparatus 1 is configured to write an image at a density of 1200 dpi in the main scanning direction and at a density of 600 dpi in the sub-scanning direction. On the other hand, input image data has a density of 600 dpi in the main scanning and sub-scanning directions. That is, the image forming apparatus 1 controls the LD unit 27 to cause the laser diode thereof to turn on and off at a density twice the density of the input image data in the main scanning direction. In addition, the smallest width of the PWM signal is defined as a width at a one-eighth duty ratio, that is, the smallest width is one-eighth of a full width capable of writing an image of one dot of image data.

In the image forming apparatus 1, since the LD is controlled to turn on and off at a density twice the input image density in the main scanning direction, as described above, a gray-scale pulse made of a combination of two pulses in the main scanning direction may be used to write an image of one pixel of image data.

Figure 4A:
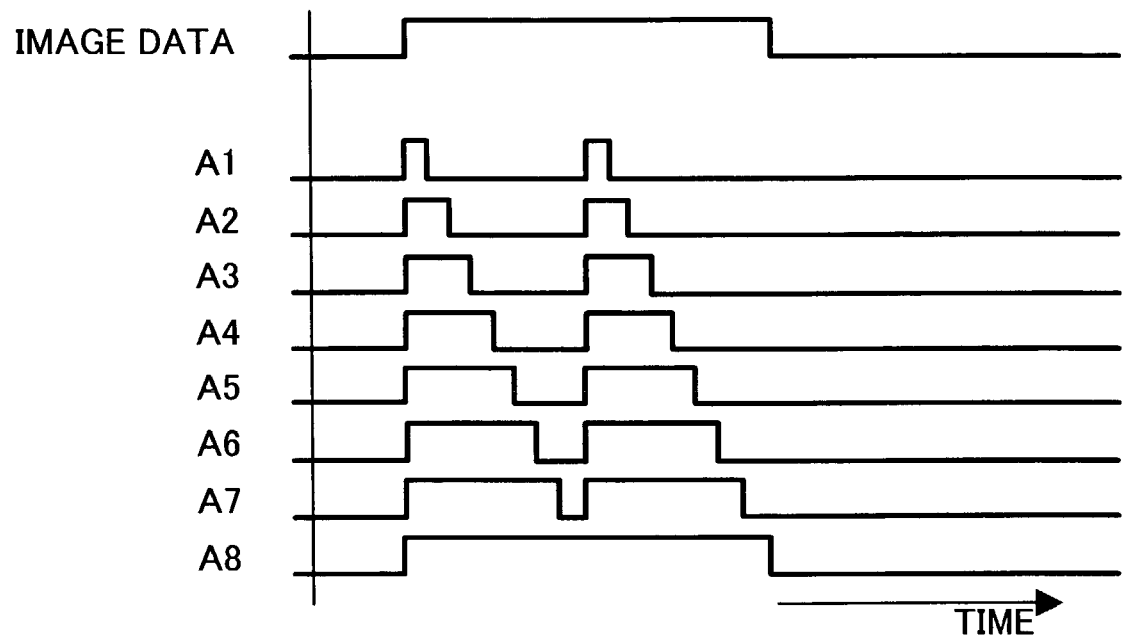
FIGS. 4A–4D and 5A and 5B are examples of gray-scale pulses having a double density in a main scanning direction and which is used by the laser diode controller of FIG. 3.

FIGS. 4A–4D show various examples of the above-mentioned gray-scale pulse. The gray-scale pulses of FIG. 4A are made of the same two pulses combined. For example, a pulse A1 is made of two combined left-positioned pulses having a width at a one-eighth duty ratio. A pulse A2 is made of two combined left-positioned pulses having a width at a two-eighth duty ratio. For convenience sake, these positional characteristics of the pulses A1 and A2 may be expressed as L1/8+L1/8 and L2/8+L2/8, respectively. In a similar manner, pulses A3–A8 are defined and are expressed as L3/8+L3/8, L4/8+L4/8, L5/8+L5/8, L6/8+L6/8, L7/8+L7/8, and 8/8+8/8, respectively.

Figure 4B:
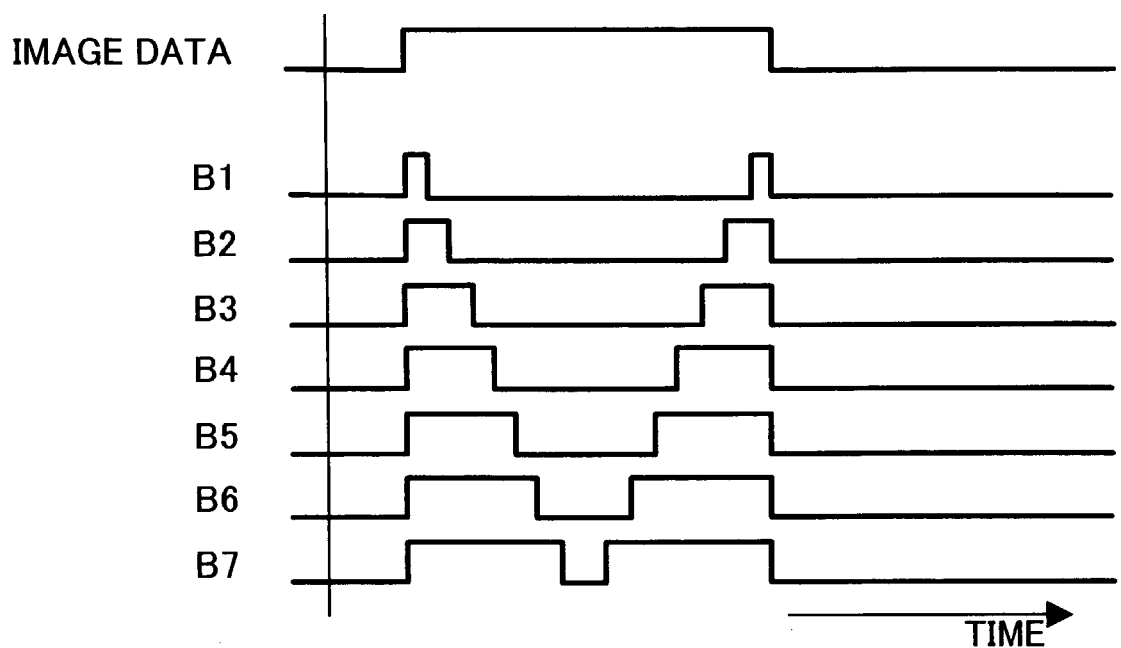

The gray-scale pulses of FIG. 4B are made of left-positioned and right-positioned pulses combined in this order. That is, a pulse B1 is made of a combination of a left-positioned pulse having a width at a one-eighth duty ratio and a right-positioned pulse having a width at a one-eighth duty ratio. A pulse B2 is made of a combination of a left-positioned pulse having a width at a two-eighth duty ratio and a right-positioned pulse having a width at a two-eighth duty ratio. As in the case of the pulses A1–A8, the pulses B1 and B2 are expressed as L1/8+R1/8 and L2/8+R2/8, respectively. Similarly, pulses B3–B7 are defined and are expressed as L3/8+R3/8, L4/8+R4/8, L5/8+R5/8, L6/8+R6/8, and L7/8+R7/8, respectively.

Figure 4C:
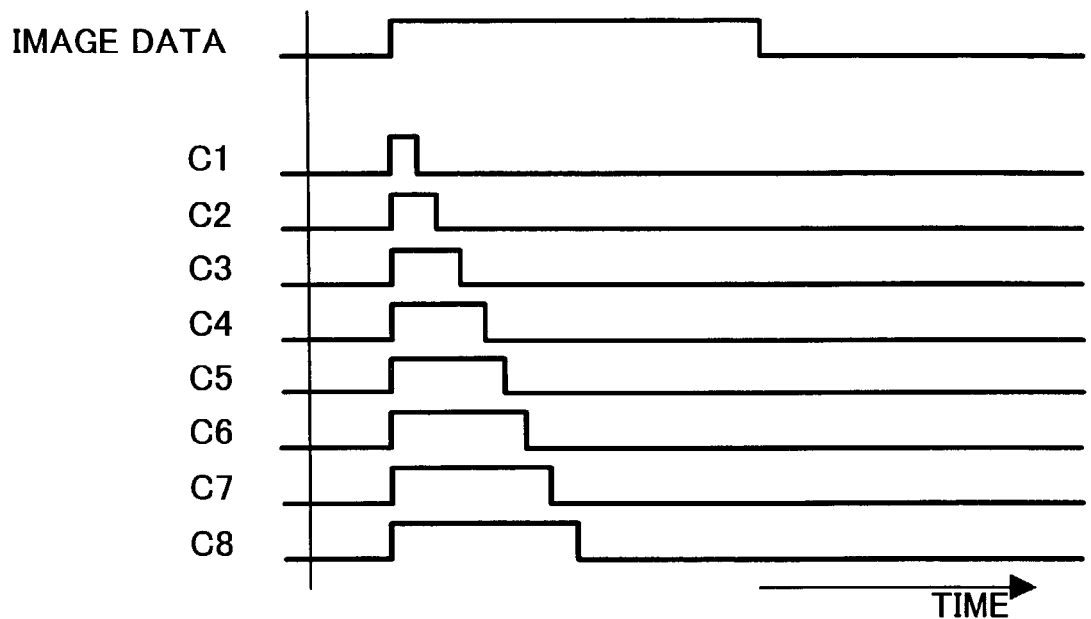

The gray-scale pulses of FIG. 4C are made of a single left-positioned pulse. For example, a pulse C1 is made of a single left-positioned pulse having a width at a one-eighth duty ratio. A pulse C2 is made of a single left-positioned pulse having a width at a two-eighth duty ratio. These pulses C1 and C2 may be expressed as L1/8 and L2/8, respectively. In a similar manner, pulses C3–C8 are defined and are expressed as L3/8–8/8, respectively.

Figure 4D:
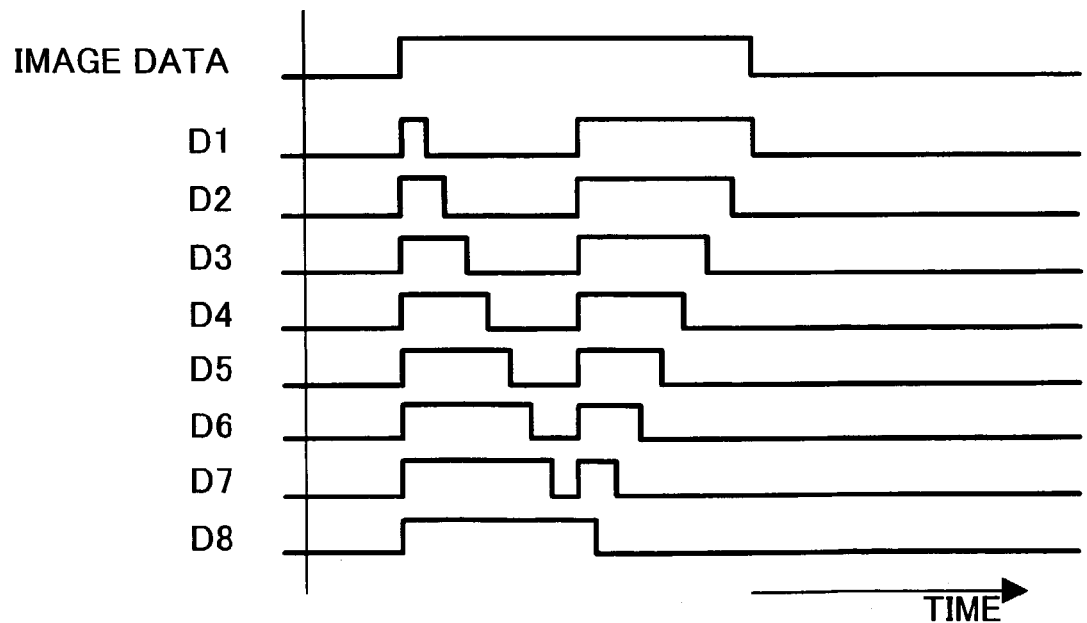

Further, the gray-scale pulses of FIG. 4D are made of left-positioned pulses having different duty ratios For example, a pulse D1 is made of a combination of a left-positioned pulse having a width at a one-eighth duty ratio and a left-positioned pulse having a width at an eight-eighth duty ratio. A pulse D2 is made of a combination of a left-positioned pulse having a width at a two-eighth duty ratio and a left-positioned pulse having a width at a seven-eighth duty ratio. That is, these pulses D1 and D2 may be expressed as L1/8+8/8 and L2/8+L7/8, respectively. Similarly, pulses D3–D8 are defined and are expressed as L3/8+L6/8, L4/8+L5/8, L5/8+L4/8, L6/8+L3/8, L7/8+L2/8, and 8/8+L1/8, respectively.

Other than these pulses shown in FIGS. 4A–4D, gray-scale pulses can be made of left-positioned and/or right-positioned pulses having variable widths at duty ratios from a zero-eighth duty ratio to an eight-eighth duty ratio in one-eighth steps. For example, gray-scale pulses can be made of right-positioned and left-positioned pulses in this order, as illustrated in FIGS. 5A and 5B.

Figure 5A:
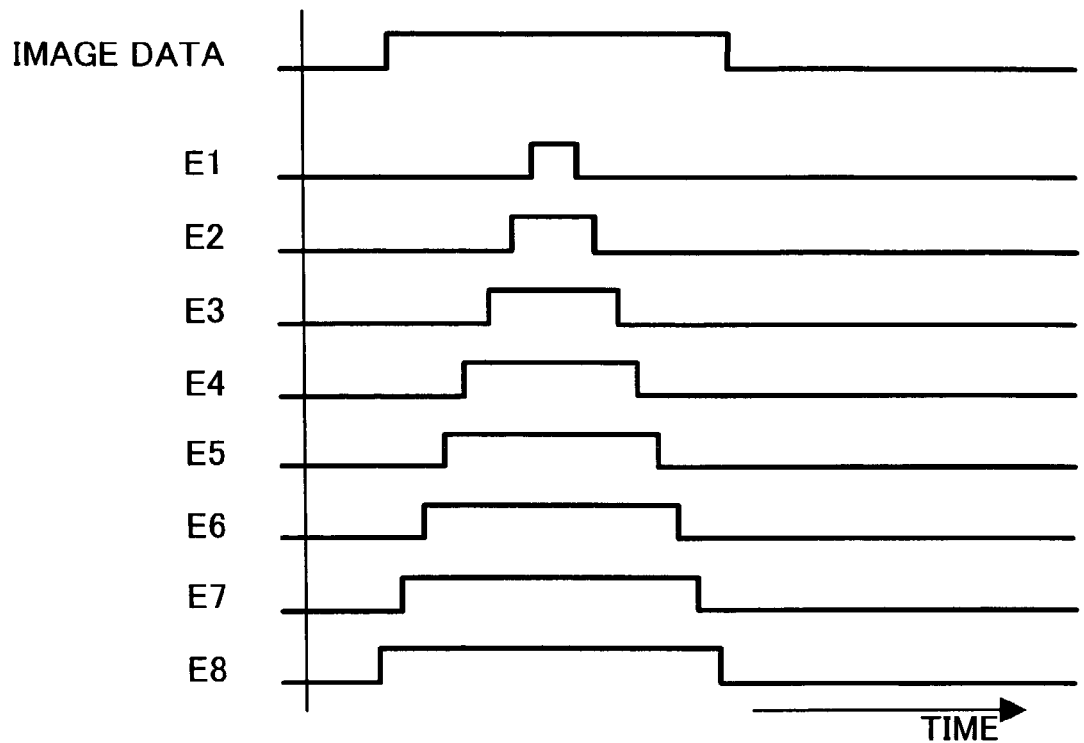
Figure 5B:
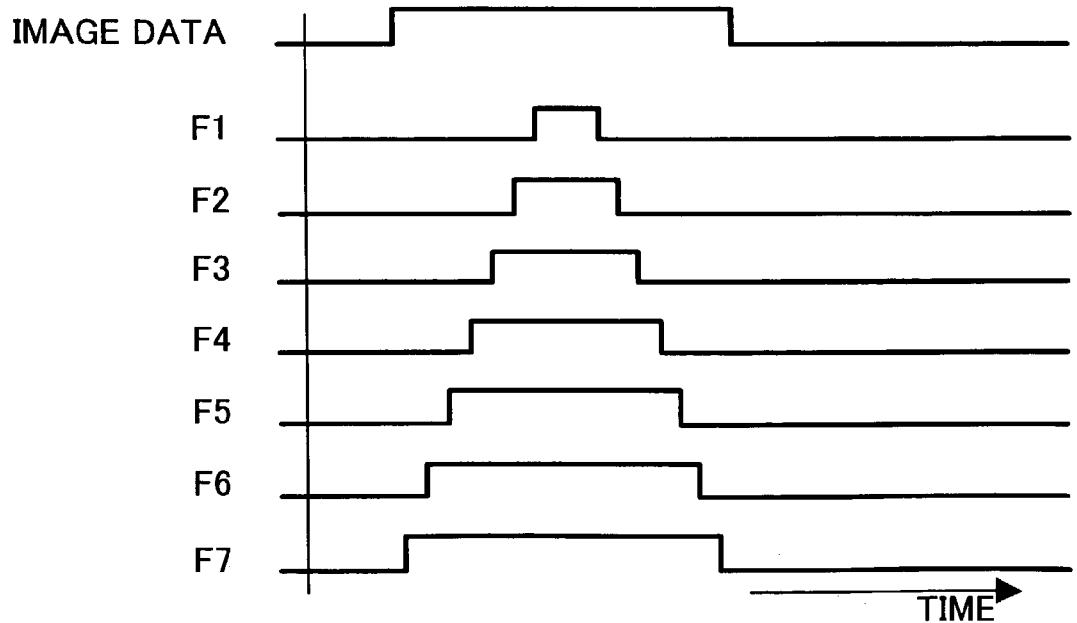

The gray-scale pulses of FIG. 5A are made of right-positioned and left-positioned pulses combined in this order and which have the same pulse width. For example, a pulse E1 is made of a combination of a right-positioned pulse and a left-positioned pulse both having a width at a one-eighth duty ratio. A pulse E2 is made of a combination of a right-positioned pulse and a left-positioned pulse both having a width at a two-eighth duty ratio. These pulses E1 and E2 are expressed as R1/8+L1/8 and R2/8+L2/8, respectively. Similarly, pulses E3–E8 are defined and are expressed as R3/8+L3/8, R4/8+L4/8, R5/8+L5/8, R6/8+L6/8, R7/8+L7/8, and 8/8+8/8, respectively.

By using the gray-scale pulses of FIG. 5A, an image of one dot of image data can be drawn in a single spot during a writing time for two consecutive dots in the main scanning direction. As a result, each single spot can be formed in a stable manner. In addition, the position of a spot to be drawn can easily be adjusted by a change of a ratio between duty ratios of the right-positioned pulse and the left-positioned pulse. For example, the gray-scale pulses of FIG. 5B are made of a combination of right-positioned and left-positioned pulses having a different duty ratio by a one-eighth pulse. That is, a pulse F1 is made of a combination of a right-positioned pulse having a width at a one-eighth duty ratio and a left-positioned pulse having a width at a two-eighth duty ratio. A pulse F2 is made of a combination of a right-positioned pulse having a width at a two-eighth duty ratio and a left-positioned pulse having a width at a three-eighth duty ratio. These pulses F1 and F2 may be expressed as R1/8+L2/8 and R2/8+L3/8, respectively. Similarly, pulses F3–F7 are defined and are expressed as R3/8+L4/8, R4/8+L5/8, R5/8+L6/8, R6/8+L7/8, and R7/8+8/8, respectively.

In a comparison of the pulse A4, L4/8+L4/8, of FIG. 4A and the pulse B4, L4/8+R4/8, of FIG. 4B, for example, both pulses A4 and B4 drive the LD unit 27 to emit the light beam from the laser diode for a substantially equal time period. However, a time interval in which the LD unit 27 is turned off and is again turned on is different with these two pulses. As a result, images formed with the pulses A4 and B4 are different from each other.

When the one-eighth pulse has a time width of 2 ns, for example, a case where a gray-scale dot may be drawn with the light beam of 6 ns, for example, can use one of the following ten variations based on a simple calculation for obtaining pulses having a width at three-eighth duty ratio. The ten variations are the pulses of a left-positioned one-eighth pulse combined with a left-positioned two-eighth pulse (L1/8+L2/8) (not shown), a left-positioned one-eighth pulse combined with a right-positioned two-eighth pulse (L1/8+R2/8) (not shown), a left-positioned two-eighth pulse combined with a left-positioned one-eighth pulse (L2/8+L1/8) (not shown), a left-positioned two-eighth pulse combined with a right-positioned one-eighth pulse (L2/8+R1/8) (not shown), a left-positioned three-eighth pulse only (e.g., the pulse C3, L3/8, of FIG. 4C), a right-positioned one-eighth pulse combined with a left-positioned two-eighth pulse (e.g., the pulse F1, R1/8+L2/8, of FIG. 5B), a right-positioned one-eighth pulse combined with a right-positioned two-eighth pulse (R1/8+R2/8) (not shown), a right-positioned two-eighth pulse combined with a left-positioned one-eighth pulse (R2/8+L1/8) (not shown), a right-positioned two-eighth pulse combined with a right-positioned one-eighth pulse (R2/8+R1/8) (not shown), and a right-positioned three-eighth pulse only (R3/8) (not shown). However, these ten variations are different from each other in timing to turn off. Besides, the time the light beam is emitted may become shorter than a theoretical value as the pulse is thinner due to a rise time of each pulse. That is, in these ten variations, the time the light beam is emitted may not accurately be proportional to the duty ratio of the pulse. Therefore, these ten variations of pulses may form images in shapes slightly different from each other.

In the present embodiment, gray-scale pulses suitable for gray-scale images which can be contained in image data are selected from among the above-mentioned variations through experiments and are previously stored in the non-volatile memory of the PWM signal generator 12. In this process, the selection of the suitable gray-scale pulses should be made through visual examination and those in a superior quality are selected. In addition, it is preferable that an exposure energy to the photosensitive drum 31 is previously measured on every possible selections and selection is made with reference to this measurement. Also, when a necessary energy for a gray-scale image is known such as when one gray-scale image requires an energy A, another gray-scale image requires an energy B, and so forth, the gray-scale pulse closest to such value may be selected.

For example, in this embodiment, the gray-scale pulses suitable for image forming with respect to gray-scale information including four gray-scale steps from 0 to 3 are obtained through the experiments and are shown in Table 1.

TABLE 1

| Gray-scale Information | 0 | 1 | 2 | 3 |
|---|---|---|---|---|
| Gray-scale Pulse | 0 | R2/8 + L3/8 | R3/8 + L5/8 | RG/8 + L7/8 |

By using these gray-scale pulses, the PWM signal corresponding to one dot of image data can be selected from among various choices even when a number of the PWM signals to be generated to write one dot is relatively small. The PWM signal generator 12 outputs the above-mentioned gray-scale pulses as the PWM signals to the LD driver 13 so as to drive the LD unit 27. Thereby, as a result, an image quality can be improved.

It may be possible that the gray-scale pulses are stored in a ROM provided to the printer controller 18 or a control unit for controlling the operations of the entire apparatus and that the gray-scale pulses stored in such ROM are set to a memory of the PWM signal generator 12. In this case, the memory of the PWM signal generator 12 may be a non-volatile memory.

Next, other examples of the gray-scale pulse used in the image forming apparatus 1 are explained with reference to FIGS. 6A–6D. As set forth, the image forming apparatus 1 is configured to have an image writing density of 1200 dpi in the main scanning direction and of 600 dpi in the sub-scanning direction. In this discussion, however, the image writing densities in the main scanning and sub-scanning directions are changed to 600 dpi and 1200 dpi, respectively, while the densities of input image data in the main scanning and sub-scanning directions remain 600 dpi. With this configuration, the LD unit 27 is controlled to turn the laser diode on and off at a resolution twice the input image density in the sub-scanning direction.

Therefore, the image forming apparatus 1 can use a gray-scale pulse made of a combination of two pulses in the sub-scanning direction to write an image of one pixel of image data. In other words, a pulse made of a combination of a pulse of a first line and a pulse of a second line can be used to write an image of one pixel of image data. More generally, a pulse made of a combination of a pulse of an nth line and a pulse of an (n+1)th line can be used to write an image of one pixel of image data.

Figure 6A:
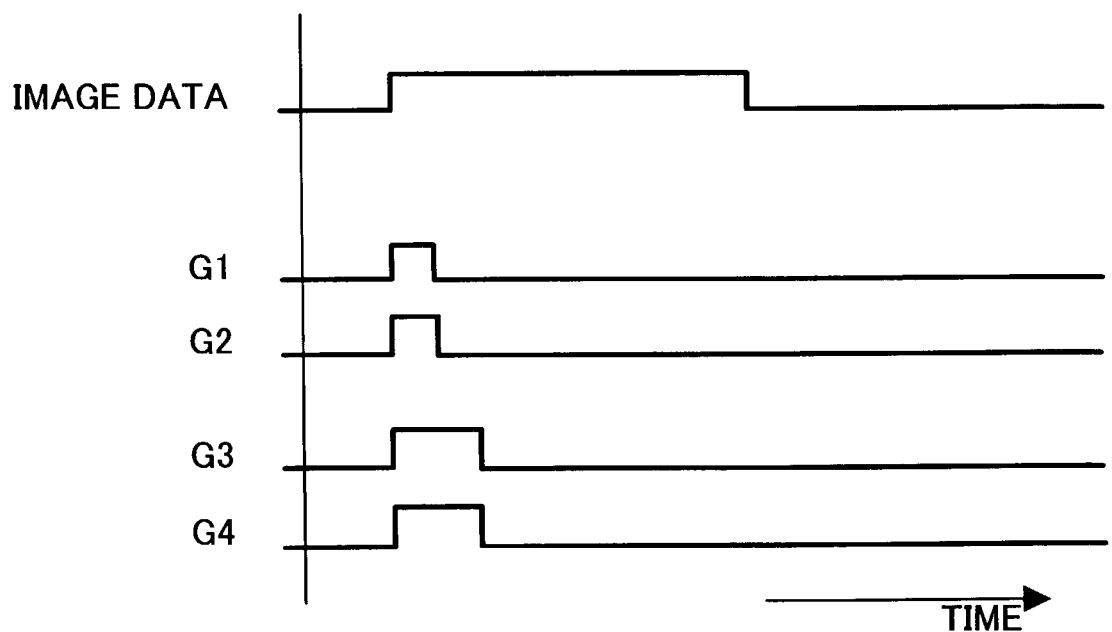
FIGS. 6A–6D are examples of gray-scale pulses having a double density in a sub-scanning direction.

FIGS. 6A–6D show examples of these gray-scale pulses. For example, FIG. 6A shows a pair of pulses G1 and G2 and a pair of pulses G3 and G4. Each pair is made of at least two same pulses consecutive in the sub-scanning direction. That is, a pulse G1 for a first line is made of a left-positioned pulse having a width at a one-eighth duty ratio, which may be expressed as L1/8. A pulse G2 for a second line is also made of a left-positioned pulse having a width at a one-eighth duty ratio, which may be expressed also as L1/8. That is, the pair of the pulses G1 and G2 is a combination of two same pulses L1/8. In a similar manner, the pair of the pulses G3 and G4 is a combination of two same pulses L2/8.

Figure 6B:
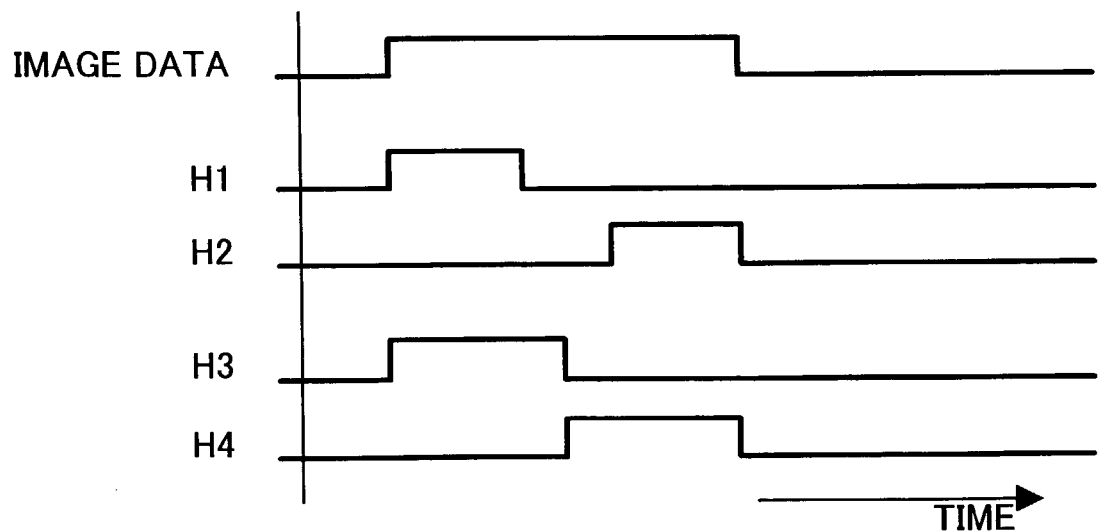

Likewise, FIG. 6B shows a pair of pulses H1 and H2 and a pair of pulses H3 and H4. Each pair is made of at least two symmetric pulses. That is, in one pair of FIG. 6B, the pulse H1 for a first line is made of a left-positioned three-eighth pulse, L3/8, and the pulse H2 for a second line is made of a right-positioned three-eighth pulse, R3/8. In the other pair of FIG. 6B, the pulse H3 for a first line is made of a left-positioned four-eighth pulse, L4/8, and the pulse H4 for a second line is made of a right-positioned four-eighth pulse, R4/8.

Figure 6C:
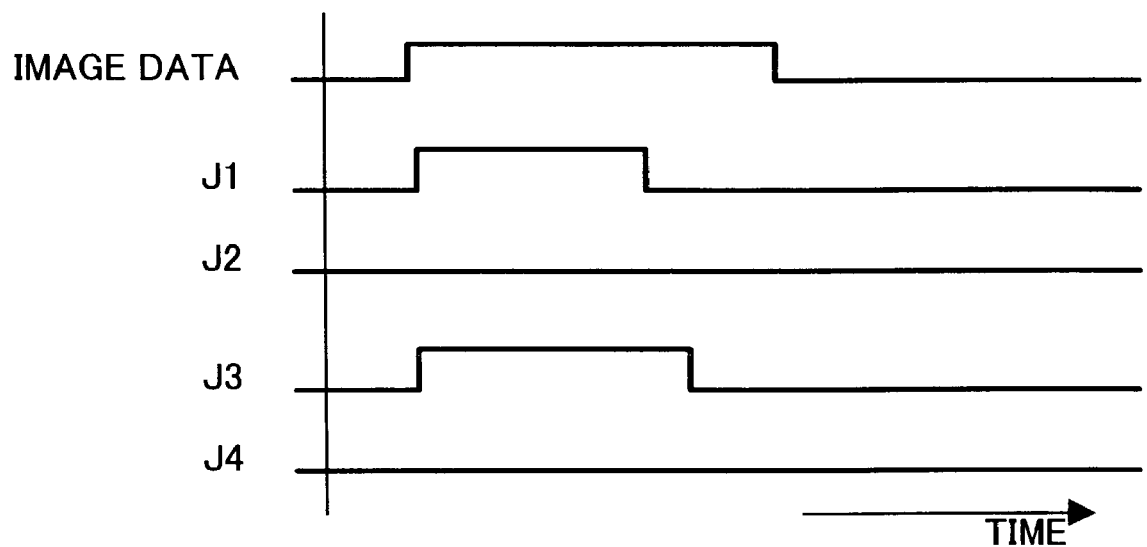

It may also be possible to use a pair of pulses made of a single pulse, as shown in FIG. 6C. That is, in a pair of pulses J1 and J2, the pulse J1 is a left-positioned fifth-eighth pulse, L5/8, and the pulse J2 is a null pulse. Likewise, in a pair of pulses J3 and J4, the pulse J3 is a left-positioned six-eighth pulse, L6/8, and the pulse J4 is null.

Figure 6D:
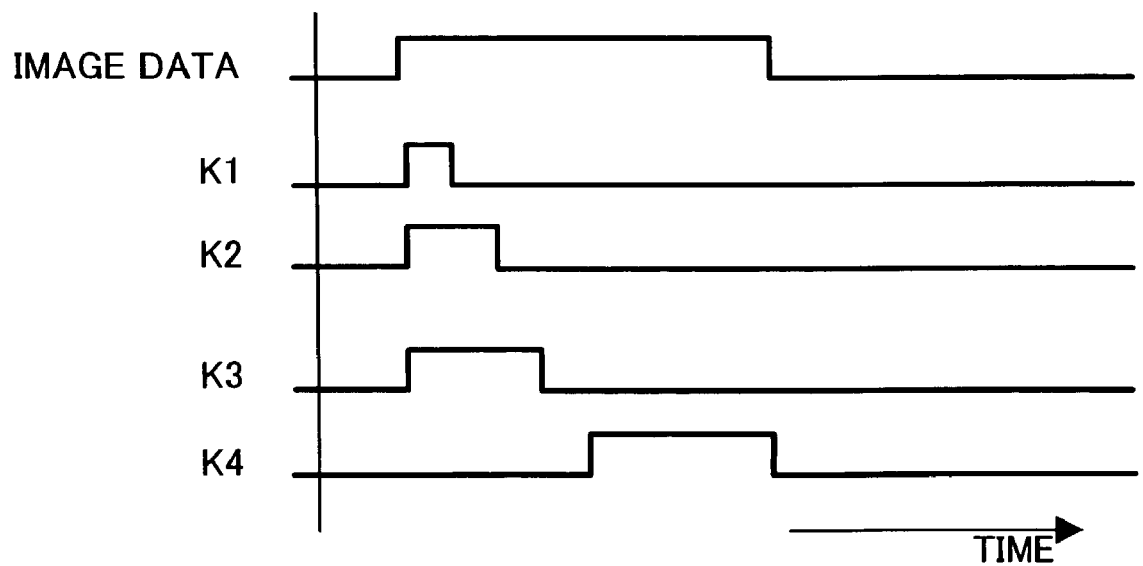

FIG. 6D shows a pair of pulses K1 and K2 and a pair of pulses K3 and K4. In the K1-and-K2 pair, each pulse is made of at least two pulses having widths at duty ratios different from each other. That is, the pulse K1 for a first line is made of a left-positioned one-eighth pulse, L1/8, and a pulse K2 for a second line is made of a left-positioned two-eighth pulse, L2/8. In the K3-and K4 pair, each pulse is made of at least two symmetric-like pulses having widths at duty ratios different from each other. That is, the pulse K3 for a first line is made of a left-positioned three-eighth pulse, L3/8, and the pulse K4 for a second line is made of a right-positioned four-eighth pulse, R3/8.

Other than these pulses shown in FIGS. 6A–6D, gray-scale pulses can be made of left-positioned and/or right-positioned pulses having variable widths at duty ratios from a zero-eighth duty ratio to an eight-eighth duty ratio in one-eighth steps.

In a comparison of the gray-scale pulses made of a combination of two consecutive pulses in the sub-scanning direction, such as a left-positioned three-eighth pulse, L3/8, and a right-positioned three-eighth pulse, R3/8, for example, both pulses of L3/8 and of R3/8 drive the LD unit 27 to emit the light beam from the laser diode for a substantially equal time period. However, a time at which the LD unit 27 is turned on to emit the light beam is different with these two pulses. As a result, images formed with the pulses of L3/8 and of R3/8 are different from each other. In addition, the time the light beam is emitted is prone to be shorter than a theoretical value as the pulse is thinner due to a rise time of each pulse and is therefore not accurately be proportional to the duty ratio of the pulse.

As in the case of the embodiment explained with reference to FIGS. 4A–4D and 5A and 5B, gray-scale pulses suitable for gray-scale dots are defined through experiments and are previously stored in the nonvolatile memory provided to the PWM signal generator 12. The PWM signal generator 12 outputs such gray-scale pulses as PWM signals to the LD driver 13 to drive the LD unit 27. In this way, an image quality can be improved.

In this case, the PWM signal generator 12 is controlled to output a pulse of a first line part of a gray-scale pulse as the PWM signal so as to write a first line part of a pixel of image data and to output a pulse of a second line part of the gray-scale pulse as the PWM signal so as to write a second line part of the pixel of the image data.

Next, other examples of the gray-scale pulse used in the image forming apparatus 1 are explained with reference to FIGS. 7A–7E. As set forth, the image forming apparatus 1 is initially configured to have an image writing density of 1200 dpi in the main scanning direction and of 600 dpi in the sub-scanning direction. In this discussion, however, the image writing densities in the main scanning and sub-scanning directions are both set to 1200 dpi, while the densities of input image data in the main scanning and sub-scanning directions remain 600 dpi. With this configuration of the image forming apparatus 1, the LD unit 27 is controlled to turn the laser diode on and off at a resolution twice the input image density in the main scanning and sub-scanning directions.

Therefore, the image forming apparatus 1 uses a gray-scale pulse made of a combination of two pulses in each of the main scanning and sub-scanning directions to write an image of one pixel of image data. That is, a total sum of four pulses can be used. In practice, a gray-scale pulse of the present embodiment is made of a combination of a pulse for a first line part made of one of the gray-scale pulses of FIGS. 4A–4D or FIGS. 5A and 5B and a pulse for a second line part made of one of the gray-scale pulses of FIGS. 4A–4D or FIGS. 5A and 5B. More generally, a gray-scale pulse of the present embodiment is made of a combination of a pulse for an nth line part made of one of the gray-scale pulses of FIGS. 4A–4D or FIGS. 5A and 5B and a pulse for an (n+1)th line part made of one of the gray-scale pulses of FIGS. 4A–4D or FIGS. 5A and 5B. The thus-made gray-scale pulse can write an image of one pixel of image data.

Figure 7A:
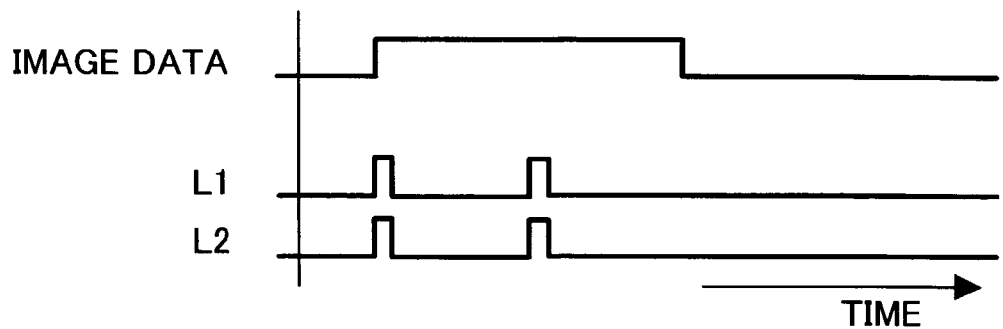
FIGS. 7A–7E are examples of gray-scale pulses having a double density in the main scanning and sub-scanning directions.

FIGS. 7A–7E show examples of these gray-scale pulses. For example, FIG. 7A shows a pair of a pulse L1 for a first line part and a pulse L2 for a second line part, both having at least two same pulses. That is, each of the pulses L1 and L2 is made of a combination of two left-positioned one-eighth pulses, L1/8+L1/8.

Figure 7B:
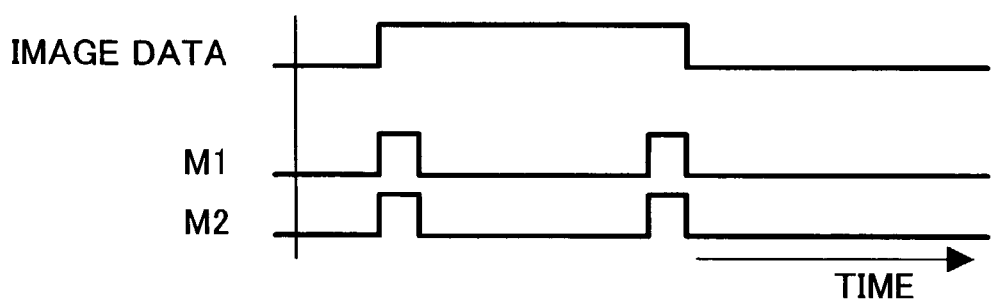

Likewise, FIG. 7B shows a pair of a pulse M1 for a first line part and a pulse M2 for a second line part, both having at least two symmetrical pulses. That is, each of the pulses M1 and M2 is made of a combination of a left-positioned two-eighth pulse and a right-positioned two-eighth pulse, L2/8 +R2/8.

Figure 7C:
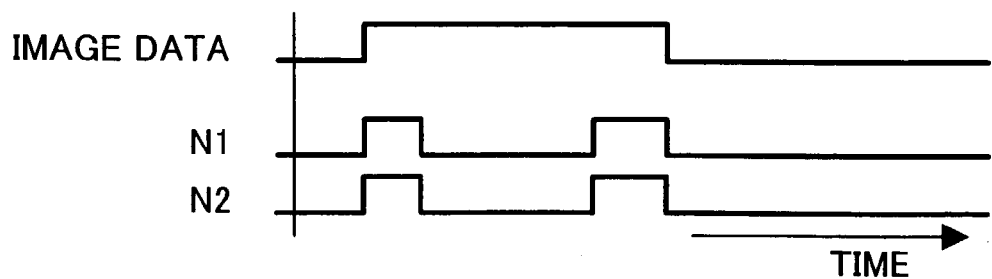

FIG. 7C shows a pair of a pulse N1 for a first line part and a pulse N2 for a second line part, having at least two approximately symmetrical pulses with different duty ratios. That is, each of the pulses N1 and N2 is made of a combination of a left-positioned three-eighth pulse and a right-positioned four-eighth pulse, L3/8 +R3/8.

Figure 7D:
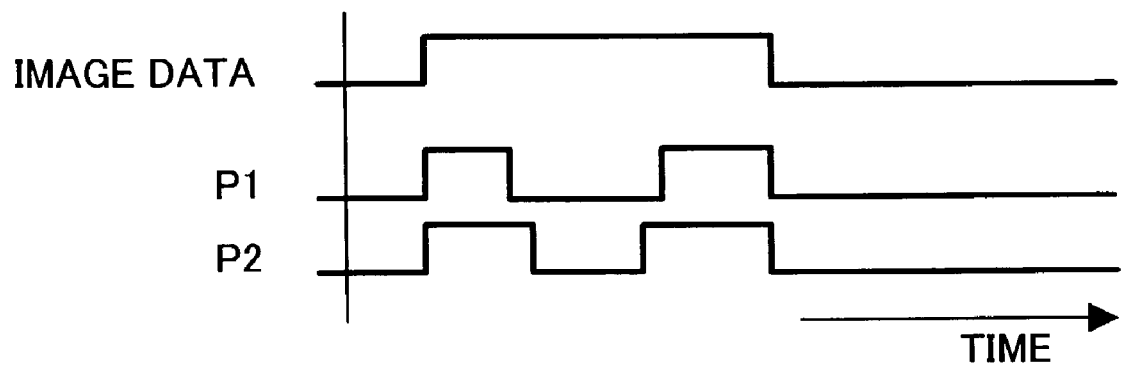

FIG. 7D shows a pair of a pulse P1 for a first line part and a pulse P2 for a second line part, having at least two approximately symmetrical pulses with different duty ratios. That is, the pulse P1 is made of a combination of a left-positioned four-eighth pulse and a right-positioned five-eighth pulse, L3/8 +R5/8. The pulse P2 is made of a combination of a left-positioned five-eighth pulse and a right-positioned six-eights pulse, L5/8+R6/8.

Figure 7E:
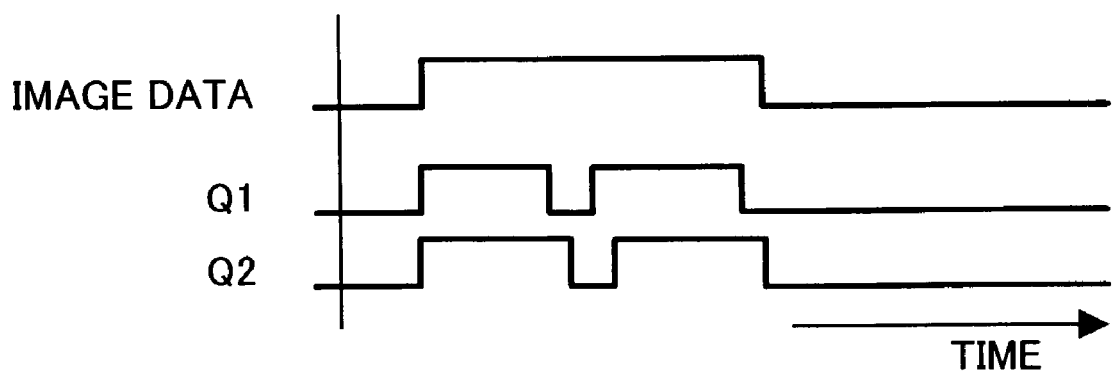

Further, FIG. 7E shows a pair of a pulse Q1 for a first line part having at least two approximately symmetrical pulses with different duty ratios and a pulse Q2 for a second line part having at least two symmetrical pulses. That is, the pulse Q1 is made of a combination of a left-positioned six-eighth pulse and a right-positioned seven-eighth pulse, L6/8+R7/8. The pulse Q2 is made of a combination of a left-positioned seven-eighth pulse and a right-positioned seven-eights pulse, L7/8+R7/8.

Other than these pulses shown in FIGS. 7A–7E, gray-scale pulses can be made of a combination of pulses for first and second line parts using left-positioned and/or right-positioned pulses having variable widths at duty ratios from a zero-eighth duty ratio to an eight-eighth duty ratio in one-eighth steps. In the combination, the pulses for the first and second line parts may be different from each other.

As in the foregoing cases, gray-scale pulses suitable for gray-scale dots are defined through experiments and are previously stored in the nonvolatile memory provided to the PWM signal generator 12. The PWM signal generator 12 outputs such gray-scale pulses as PWM signals to the LD driver 13 to drive the LD unit 27. In this way, an image quality can be improved.

In this case, the PWM signal generator 12 is controlled to output a pulse of a first line part of a gray-scale pulse as the PWM signal so as to write a first line part of a pixel of image data and to output a pulse of a second line part of the gray-scale pulse as the PWM signal so as to write a second line part of the pixel of the image data.

For example, in this embodiment, the gray-scale pulses suitable for image forming with respect to gray-scale information including four gray-scale steps from 0 to 3 are obtained through the experiments and are shown in Table 2.

In an image forming apparatus capable of changing a writing resolution depending upon a mode of image forming, the image writing in a normal paper mode, for example, may be performed using the gray-scale pulses indicated in Table 2 at a resolution twice a density of input image data in the main scanning direction. In a thick paper mode, for another example, the image writing may be performed using the gray-scale pulses indicated in Table 2 at a resolution twice a density of input image data in both main scanning and sub-scanning directions, wherein an amount of the light beam should be set to that in the normal mode multiplied by 0.95. In this way, it is possible to improve an image quality in both normal and thick paper modes and also to make the image qualities in these two modes closer and closer to each other. Thus, defining suitable gray-scale pulses depending upon the modes of image forming may be of advantageous.

TABLE 2

| Gray-scale | Gray-scale Information | | | |
|---|---|---|---|---|
| Pulse | 0 | 1 | 2 | 3 |
| First line | 0 | L4/8 | R5/8 | R7/8 + L1/8 |
| Second line | 0 | L4/8 | R5/8 | R7/8 + L1/8 |

Figure 8:
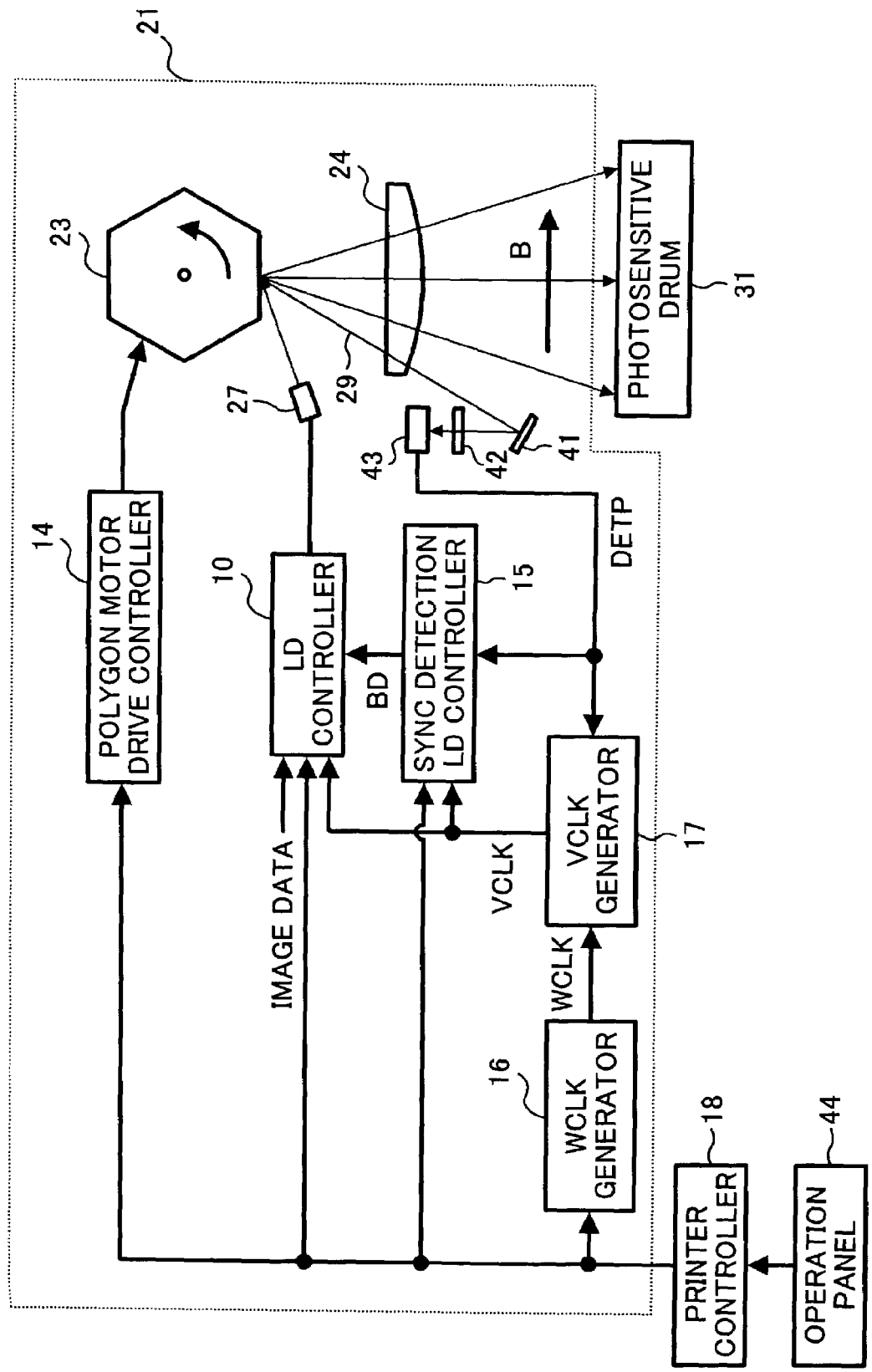
FIG. 8 is a schematic block diagram for explaining a modified version of the image forming apparatus such that data for determining the gray-scale pulses is input by an operator through an operation panel.

Next, a modified configuration of the image forming apparatus 1 is explained with reference to FIG. 8. In this modified configuration, the image forming apparatus 1 is provided with an operation panel 44, as shown in FIG. 8. The operation panel 44 includes keys or a touch-sense panel for inputting alphanumerical characters, for example, to specify a preferable mode of image forming. The operation panel 44 may be combined with a console panel for controlling the entire operations of the apparatus.

After storing the various gray-scale pulses corresponding to the gray-scale information with respect to the image data into a re-programmable nonvolatile memory such as an EEPROM, a user may input or change data of a desired gray-scale pulse through the operation panel 44.

Such a re-programmable nonvolatile memory may be provided to the PWM signal generator 12, as described above, or it may be provided to the printer controller 18 or a controller for controlling the entire operations of the apparatus so that the data of the gray-scale pulses can be transferred to the memory of the PWM signal generator 12 on an as needed basis.

It is also preferable to provide a communications unit for exchanging data with a host system such as a personal computer to the image forming apparatus 1 so that the data of the gray-scale pulses can be changed in accordance with information input from the host system.

With the thus-arranged configuration, the image forming apparatus 1 is capable of easily adjusting an image quality and also specifying suitable gray-scale pulses in response to an event that performance characteristics of key components such as a photosensitive member, a light-emitting element, toner, and so on are changed or degraded by replacement of such key components, for example. Thus, the image forming apparatus 1 can maintain a superior quality of the image forming feature for a relatively long time period.

Figure 9:
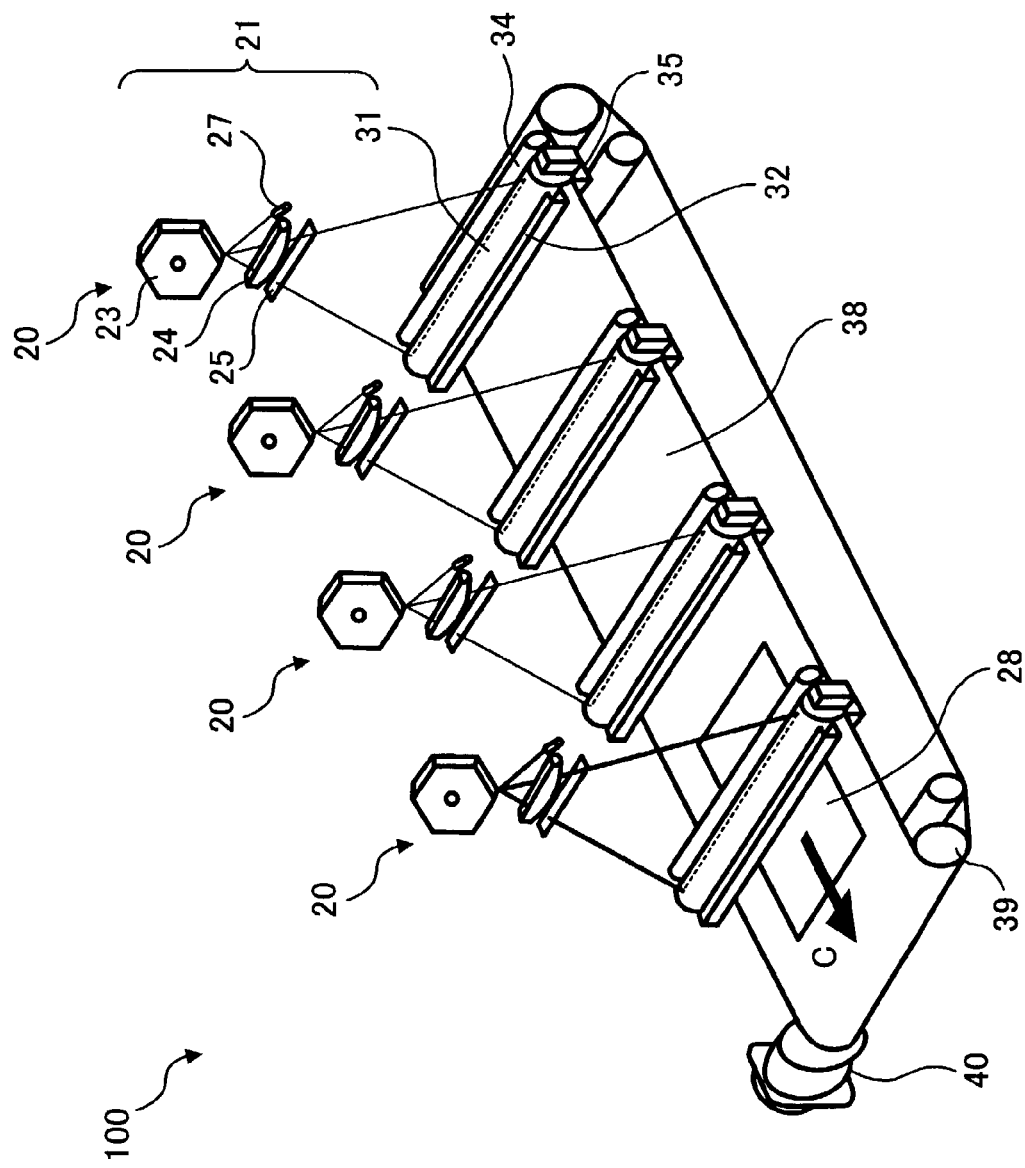
FIG. 9 is an illustration for explaining a color image forming apparatus according to another embodiment of the present invention.

Next, a color image forming apparatus 100 according to a preferred embodiment of the present invention is explained with reference to FIG. 9. FIG. 9 illustrates a main portion of the color image forming apparatus 100.

As illustrated in FIG. 9, the color image forming apparatus 100 is provided with four of the laser writing systems 20 in use for yellow (Y), magenta (M), cyan (C), and black (B) colors. In this color image forming apparatus 100, the recording sheet 28 is conveyed in a direction C by a transfer belt 38 which is rotated by a transfer roller 39 and a transfer motor 40 and four times of image forming processes using the above-mentioned four colors are in turn performed relative to the recording sheet 28. As a result, a complete color image composed of the four overlaying color images is formed on the recording sheet 28.

During this process, the aforementioned gray-scale pulses made of a combination of at least two pulses are used to control the laser diode to turn on and off so as to form each color image in a superior quality. Therefore, a complete color image composed of the four overlaying color images has a superior quality.

It is also possible to define gray-scale pulses in a way different from one color to another. This arrangement is useful particularly for a case where an electrostatic latent image and a toner image have a relationship of image density different from one color to another. That is, the gray-scale pulses suitable for each color can be used in an image forming process for each color.

Figure 10:
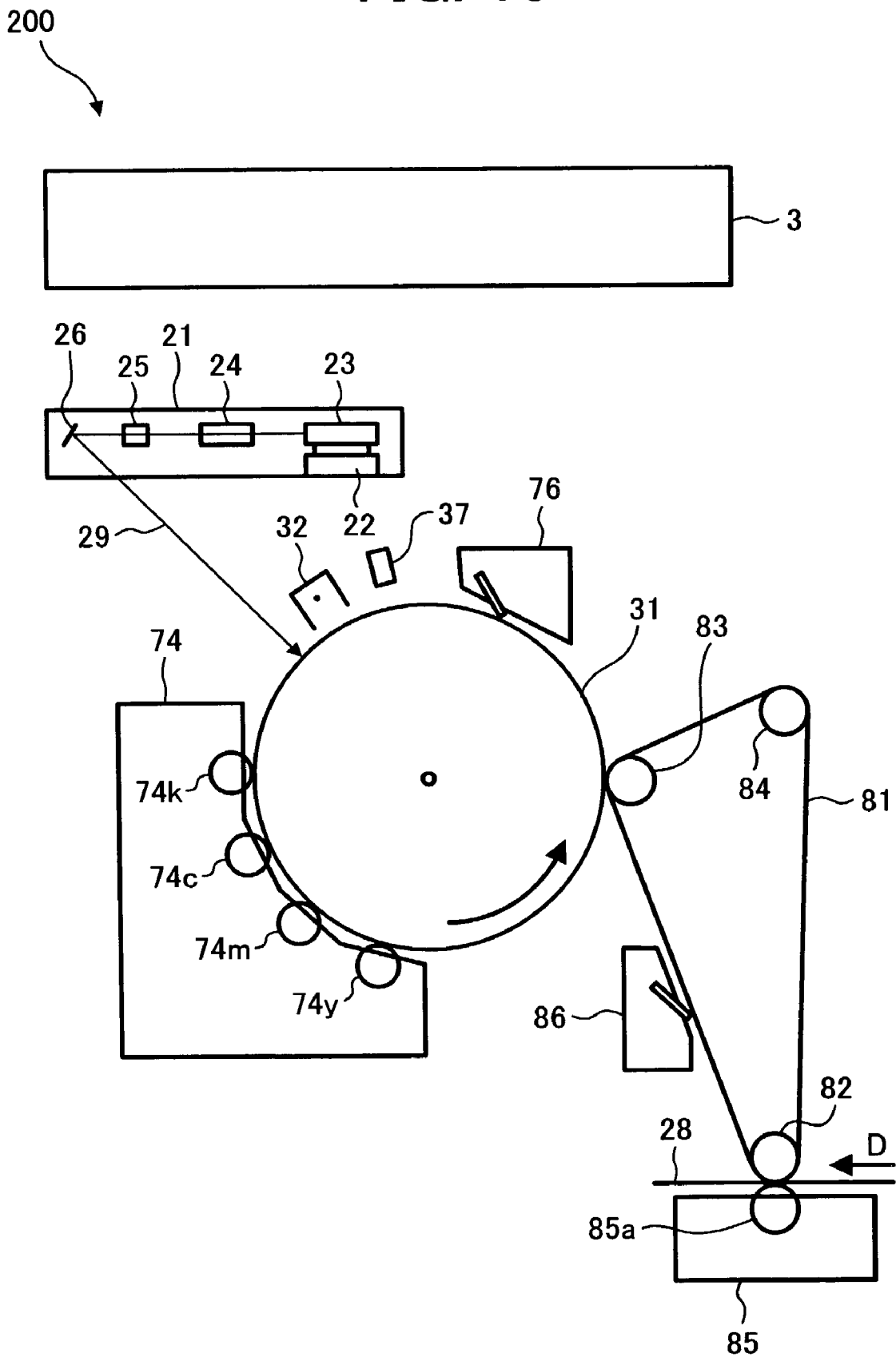
FIG. 10 is an illustration for explaining a color image forming apparatus according to a different embodiment of the present invention.
Figure 11:
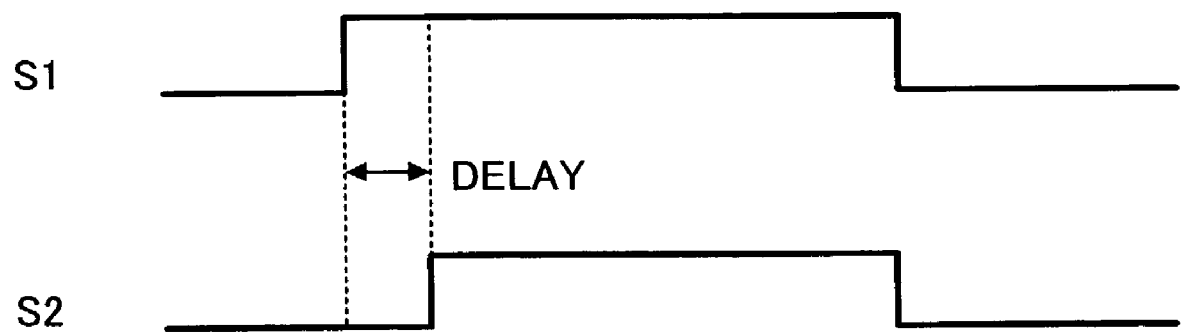
FIG. 11 is a time chart for explaining a relationship between a instruction signal for turning a light beam on and an actual light beam driven by the instruction signal in a background image forming apparatus.

Next, a color image forming apparatus 200 according to another preferred embodiment of the present invention is explained with reference to FIG. 10. The color image forming apparatus 200 adopts the laser writing system having a single photosensitive member. As shown in FIG. 10, the color image forming apparatus 200 includes the image reading unit 3, the optical unit 21, the photosensitive drum 31, and the charging unit 32, the discharging unit 37, which are the components same as those used in the image forming apparatus 1 of FIG. 1. The color image forming apparatus 200 further includes a development unit 74, a photosensitive member cleaning unit 75, an intermediate transfer belt 81, a belt drive roller 82, a belt transfer bias roller 83, a belt supporting roller 84, a sheet transfer unit 85, and a belt cleaning unit 86.

The development unit 74 develops a latent image of each color image formed on the surface of the photosensitive drum 31 using a corresponding color. For this, the development unit 74 is provided with development sleeves 74y, 74m, 74c, and 74k for rotating so as to make development agents having yellow (Y), magenta (M), cyan (C), and black (B) colors in contact with the surface of the photosensitive drum 31 where an electrostatic latent image is formed. The development unit 74 is further provided with a development paddle (not shown) for rotating in order to mix the development agents.

The photosensitive drum cleaning unit 76 is a cleaner for cleaning the photosensitive drum 31 in a way similar to that the cleaning unit 36 does.

The intermediate transfer belt 81 is a member for temporarily carrying a toner image formed on the surface of the photosensitive drum 31 by the development unit 74. The intermediate transfer belt 81 is extended with tension around the belt drive roller 82, the belt transfer bias roller 83, and the belt supporting roller 84 and is driven by a drive motor (not shown).

The sheet transfer unit 85 transfers the toner image carried on the intermediate transfer belt 81 onto the recording sheet 28, and is provided with a sheet transfer bias roller 85a and a moving mechanism (not shown) for making the transfer bias roller 85a in contact with the recording sheet 28 on demand. The belt cleaning unit 86 removes the residual toner left on the intermediate transfer belt 81 after the transfer process.

The color image forming apparatus 200 forms an electrostatic latent image by writing an image on the surface of the photosensitive drum 31 with the optical unit 21 in accordance with image data of an image read through the image reading unit 3. In this operation, the color image is formed in an order of black, cyan, magenta, and yellow colors. However, the order of colors can be changed.

Upon starting the image forming operation, the image data of black color is first used to form a latent image of black color. Then, in order to start developing the latent image of black color from the leading edge thereof, the development sleeve 74k is started to rotate before the leading edge of the latent image of black color is brought to a development position of the development unit 74. The latent image of black color is then developed with the black toner. After that, the development of the black color image is stopped when the trailing edge of the latent image of black color is brought out of the development position. This stop of the development of the black color image is carried out at least before the leading edge of the latent image of cyan color is brought to the development position.

The black toner image formed on the surface of the photosensitive drum 31 is transferred onto the surface of the intermediate transfer belt 81 rotated at the same speed as that of the photosensitive drum 31. This transfer is carried out by making the intermediate transfer belt 81 in contact with the photosensitive drum 31 and applying a predetermined voltage to the belt transfer bias roller 83.

After that, the images of cyan, magenta, and yellow colors are in turn formed in a similar manner on the surface of the photosensitive drum 31 and are transferred one after another onto the surface of the intermediate transfer belt 81. That is, the cyan toner image overlays the black toner image, the magenta toner image overlays the cyan toner image, and the yellow toner image overlays the magenta toner image. Thus, a color image made of the four color toner images is generated on the intermediate transfer belt 81. Upon making such a color image made of the four color toner images on the intermediate transfer belt 81, the sheet transfer unit 85 transfers the color image at a time onto the recording sheet 28 conveyed in a direction D by a sheet transfer belt (not shown). The recording sheet 28 carrying the color image thereon is conveyed to a fixing mechanism (not shown) which melts and fixes the color image to the surface of the recording sheet 28. In the above process, the conveyance of the recording sheet 28 is timed to a motion that the leading edge of the color image generated on the intermediate transfer belt 81 is brought to a sheet transfer position.

The sheet transfer bias roller 85a of the sheet transfer unit 85 is usually not in contact with the intermediate transfer belt 81 and is brought into a position to press via the recording sheet 28 by pressure from the moving mechanism during the time the color image made of the four color toner images on the intermediate transfer belt 81 is transferred onto the recording sheet 28 in the way as described above. When moved to the position to press the intermediate transfer belt 81 via the recording sheet 28, the sheet transfer bias roller 85a applies the predetermined voltage to the recording sheet 28 so that the transfer of the color image from the intermediate transfer belt 81 onto the recording sheet 28 is performed. In addition, the belt cleaning unit 86 is also provided with a moving mechanism (not shown) that brings a cleaning blade (not shown) of the belt cleaning unit 86 away from the intermediate transfer belt 81 during the time the intermediate transfer belt 81 carries the color toner images thereon.

In this color image forming apparatus 200, the gray-scale pulses made of at least two combined pulses, as described above, are used in accordance with the densities of image data and resolution so as to form an image in a superior quality. In this instance, gray-scale pulses differing from a color to another are predefined and applied according to colors when a relationship between the image densities of an electrostatic latent image for a toner color and a corresponding color toner image is different by color of the toner.

As discussed in the background section, a red laser diode having a 650-nm-ranged wave length has recently been used as a source of light beam in use for an image forming apparatus. In comparison with a conventional laser diode of a 780-nm-ranged wave length, the red laser diode of a 650-nm-ranged wave length is advantageously capable of reducing a spot size and is therefore useful for a case where a high resolution image forming is performed.

On the other hand, the red laser diode has a characteristic that emission of light beam has a delay relative to a time of receiving a signal for instructing a light emission to the laser diode. Therefore, a pulse of a relatively low duty ratio may actually not be used depending upon a solution or a recording speed. Further, a proportional relationship between a time that the light beam is turned on and a duty ratio of a pulse is largely collapsed. With these adverse effects, however, the gray-scale pulses provide a variety of pulse selections and are therefore capable of being used to form images in a superior quality, corresponding to various gray-scale values included in the image data. Accordingly, it is particularly effective to apply the present invention to an image forming apparatus adopting a laser writing system using the red laser diode having 650-nm-ranged wave length.

In the aforementioned examples, the laser diode is driven by the signal at a density twice an input image density in at least one of the main scanning and sub-scanning directions. However, the ratio of the writing density is not limited to twice an input image density and can be any integer greater than two. For example, when the ratio of the writing density is defined as a number n greater than two, suitable gray-scale pulses may be defined with a combination of n pulses. Duty ratios of the gray-scale pulses in the main scanning and sub-scanning directions may differently be defined.

Further, in the aforementioned examples, the duty ratio of the pulse to generate the gray-scale pulses is changeable in one-eighth steps. However, other steps such as one-fourth, one-sixth, etc., can also be used.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application No. JPAP2001-149731 filed on May 18, 2001 in the Japanese Patent Office, the entire contents of which are incorporated by reference herein.

What is claimed is:

1. An image forming apparatus, comprising:
    a photosensitive member configured to have a latent image written on a surface thereof;
    a modulation data storage device configured to store a plurality of different gray-scale pulse sets, each of said plurality of different gray-scale pulse sets including a plurality of gray-scale pulses having pulse widths differing from each other in steps of a predetermined value based on gray-scale information corresponding to gray-scale input image data values, wherein each of said plurality of gray-scale pulses are formed from a combination of at least two pulses including at least one left-positioned pulse and at least one right-positioned pulse;
    a pulse width modulator configured to select a gray-scale pulse set from among said plurality of different gray-scale pulse sets stored in said modulation data storage device in accordance with said gray-scale information contained in input image data,
    said pulse width modulator being configured to perform a pulse width modulation operation to control a light beam to turn on and off in accordance with said input image data at a rate corresponding to at least twice an image density of said input image data by using said gray-scale pulse set selected; and
    an optical writing mechanism configured to scan said light beam on said photosensitive member to form a latent image in accordance with said input image data;
    wherein said pulse width modulator is configured to control said light beam to turn on and off in units of pixel by synthesizing said left-positioned pulse varying in a predetermined pulse pattern and said right-positioned pulse varying in an other predetermined pulse pattern.

2. The apparatus as defined in claim 1, wherein said pulse width modulator is configured to control the light beam to turn on and off at a rate corresponding to at least twice an image density of said input image data in a main scanning direction.

3. The apparatus as defined in claim 1, wherein said pulse width modulator is configured to control the light beam to turn on and off at a rate corresponding to at least twice an image density of said input image data in a sub-scanning direction.

4. The apparatus as defined in claim 1, wherein said pulse width modulator is configured to control the light beam to turn on and off at a rate corresponding to at least twice an image density of said input image data in both main scanning and sub-scanning directions.

5. The apparatus as defined in claim 1, further comprising:
an input mechanism configured to receive input information for predefining or changing the gray-scale pulses included in said plurality of gray-scale pulses of said gray-scale pulse set prestored in said modulation data storage device.

6. The apparatus as defined in claim 1, further comprising:
a source of said light beam that includes a red laser diode having a light output in a 650 nm wavelength range.

7. The apparatus as defined in claim 1,
wherein said pulse width modulator is configured to perform said pulse width modulation operation for said input image data of yellow, magenta, cyan, and black colors; and
wherein said optical writing mechanism is configured to form said latent image with yellow, magenta, cyan, and black colors on said photosensitive member in accordance with said input image data of yellow, magenta, cyan, and black colors, respectively, by causing said light beam to scan said photosensitive member, said light beam being controlled in accordance with said input image data of yellow, magenta, cyan, and black colors, respectively.

8. The apparatus as defined in claim 1, wherein said predetermined value is a one-eighth of a pixel of said image data to be input.

9. An image forming apparatus according to claim 1, wherein said plurality of gray-scale pulses are further being selected in accordance with an exposure energy to said photosensitive member previously measured for each gray-scale pulse in said plurality of different gray-scale sets.

10. An image forming apparatus according to claim 1, wherein said plurality of gray-scale pulses are further being selected in accordance with a visual examination of an image previously formed by said image forming apparatus.

11. An image forming apparatus, comprising:
photosensitive member means including a surface configured to receive a latent image;
modulation data storing means configured to store a plurality of different gray-scale pulse sets, each of said plurality of different gray-scale pulse sets including a plurality of gray-scale pulses having pulse widths which differ from each other in steps of a predetermined value corresponding to gray-scale information including a plurality of gray-scale values contained in input image data, each of said plurality of gray-scale pulses being formed of a combination of at least two pulses including at least one left-positioned pulse and at least one right-positioned pulse;
pulse width modulating means configured to select a gray-scale pulse set from among said plurality of different gray-scale pulse sets stored in said modulation data storing means in accordance with gray-scale information contained in the input image data,
pulse width modulating means being configured to perform a pulse width modulation operation to control a light beam to turn on and off in accordance with said input image data at a rate corresponding to at least twice an image density of said input image data by using said gray-scale pulse set selected; and optical writing means configured to cause said light beam to scan said photosensitive member means so as to form a latent image on said photosensitive member means in accordance with said input image data;
wherein said pulse width modulating means is configured to control said light beam to turn on and off in units of pixel by synthesizing said left-positioned pulse varying in a predetermined pulse pattern and said right-positioned pulse varying in an other predetermined pulse pattern.

12. The apparatus as defined in claim 11, wherein said pulse width modulating means is configured to control the light beam to turn on and off at a rate corresponding to at least twice an image density of said input image data in a main scanning direction.

13. The apparatus as defined in claim 11, wherein said pulse width modulating means is configured to control the light beam to turn on and off at a rate corresponding to at least twice a image density of said input image data in a sub-scanning direction.

14. The apparatus as defined in claim 11, wherein said pulse width modulating means is configured to control the light beam to turn on and off at a rate corresponding to at least twice an image density of said input image data in both main scanning and sub-scanning directions.

15. The apparatus as defined in claim 11, further comprising:
inputting means for inputting information for predefining or changing said plurality of gray-scale pulses included in said plurality of different gray-scale pulse sets prestored in said modulation data storing means.

16. The apparatus as defined in claim 11, further comprising:
a source of said light beam that includes a red laser diode having a light output in a 650 nm wavelength range.

17. The apparatus as defined in claim 11,
wherein said pulse width modulating means is configured to perform said pulse width modulation operation for said input image data of yellow, magenta, cyan, and black colors; and
wherein said optical writing means is configured to form said latent image with yellow, magenta, cyan, and black colors on said photosensitive member means in accordance with said input image data of yellow, magenta, cyan, and black colors, by causing said light beam to scan said photosensitive member, said light beam being in turn controlled in accordance with said input image data of yellow, magenta, cyan, and black colors.

18. The apparatus as defined in claim 11, wherein said predetermined value is a one-eighth of a pixel of said input image data.

19. An image forming apparatus according to claim 11, wherein said plurality of gray-scale pulses are further being selected in accordance with an exposure energy to said photosensitive member previously measured for each gray-scale pulse in said plurality of different gray-scale sets.

20. An image forming apparatus according to claim 11, wherein said plurality of gray-scale pulses are further being selected in accordance with a visual examination of an image previously formed by said image forming apparatus.

21. A method of image forming, comprising steps of:
storing a plurality of different gray-scale pulse sets, each of said plurality of different gray-scale pulse sets including a plurality of gray-scale pulses having pulse widths different from each other in steps of a predetermined value in accordance with gray-scale information including a plurality of gray-scale values possibly contained in image data to be input, each of said plurality of gray-scale pulses being made of a combination of at least two pulses including at least one left-positioned pulse and at least one right-positioned pulse;

entering input image data;

selecting a gray-scale pulse set from among said plurality of different gray-scale pulse sets in accordance with gray-scale information contained in said input image data entered in said entering step, performing a pulse width modulation operation using gray-scale pulses included in said gray-scale pulse set selected by said selecting step to control a light beam to turn on and off in accordance with said input image data at a rate corresponding to at least twice an image density of said input image data entered in said entering step; and controlling said light beam to scan a photosensitive member and form a latent image on said photosensitive member in accordance with said input image data entered in said entering step;

wherein said performing said pulse width modulation operation includes turning on and off said light beam in units of pixel by synthesizing said left-positioned pulse varying in a predetermined pulse pattern and said right-positioned pulse varying in an other predetermined pulse pattern.

22. The method as defined in claim 21, wherein said performing step performs said pulse width modulation operation to control said light beam to turn on and off at a rate corresponding to at least twice an image density of said input image data in a main scanning direction.

23. The method as defined in claim 21, wherein said performing step performs said pulse width modulation operation to control said light beam to turn on and off at a rate corresponding to at least twice an image density of said input image data in a sub-scanning direction.

24. The method as defined in claim 21, wherein said performing step performs said pulse width modulation operation to control said light beam to turn on and off at a rate corresponding to at least twice an image density of said input image data in both main scanning and sub-scanning directions.

25. The method as defined in claim 21, further comprising a step of:

inputting information to predefine or to change each gray-scale pulse of said plurality of gray-scale pulse sets prestored in said storing step.

26. The method as defined in claim 21, wherein a source of said light beam is a red laser diode having a light output in a 650 nm wavelength range.

27. The method as defined in claim 21, further comprising steps of:

selecting, in said selecting step, a suitable gray-scale pulse set from among said plurality of different gray-scale pulse sets in accordance with gray-scale information contained in yellow, magenta, cyan, and black color image data included in said input image data entered by said entering step each time one of said yellow, magenta, cyan, and black color image data is processed; and performing, in said performing step, said pulse width modulation operation using gray-scale pulses included in said suitable grayscale pulse set selected in said selecting step to control said light beam to turn on and off in accordance with each of said yellow, magenta, cyan, and black color image data; and controlling, in said controlling step, said light beam to scan a photosensitive member to form a latent image on said photosensitive member in accordance with gray-scale information contained in each of said yellow, magenta, cyan, and black color image data included in said input image data entered in said entering step each time one of said yellow, magenta, cyan, and black color image data is processed.

28. The method as defined in claim 21, wherein said predetermined value is a one-eighth of a pixel of said input image data.

29. An image forming apparatus according to claim 21, wherein said plurality of gray-scale pulses are further being selected in accordance with an exposure energy to said photosensitive member previously measured for each gray-scale pulse in said plurality of different gray-scale sets.

30. An image forming apparatus according to claim 21, wherein said plurality of gray-scale pulses are further being selected in accordance with a visual examination of an image previously formed by said image forming apparatus.

31. An image forming apparatus, comprising:

a photosensitive member with a surface configured to receive a latent image corresponding to input image data;

an optical writing mechanism configured to scan a light beam on said photosensitive member to form said latent image; and a pulse width modulator configured to control said light beam based on said input image data, said light beam being controlled to turn on and off at a rate corresponding to at least twice an image density of said input image data;

wherein said latent image is formed using a gray-scale pulse set which includes a plurality of gray-scale pulses of pulse widths which differ from each other, said plurality of gray-scale pulses each being formed from a combination of at least two pulses including a left-positioned pulse and a right-positioned pulse and being selected in accordance with gray-scale information contained in said input image;

wherein said pulse width modulator is configured to control said light beam to turn on and off in units of pixel by synthesizing said left-positioned pulse varying in a predetermined pulse pattern and said right-positioned pulse varying in an other predetermined pulse pattern.

32. The image forming apparatus as defined in claim 31, wherein said plurality of gray-scale pulses are further being selected in accordance with an exposure energy to said photosensitive member previously measured for each gray-scale pulse in said plurality of different gray-scale sets.

33. An image forming apparatus according to claim 31, wherein said plurality of gray-scale pulses are further being selected in accordance with a visual examination of an image previously formed by said image forming apparatus.

34. An image forming apparatus, comprising:

a photosensitive member with a surface configured to receive a latent image corresponding to input image data;

an optical writing mechanism configured to scan a light beam on said photosensitive member to form said latent image;

a pulse width modulator configured to control said light beam based on said input image data, said light beam being controlled to turn on and off at a rate corresponding to at least twice an image density of said input image data; wherein said latent image is formed using a gray-scale pulse set which includes a plurality of gray-scale pulses of pulse widths which differ from each other, said plurality of gray-scale pulses each being formed from a combination of at least two pulses; and a storage memory configured to store a plurality of different gray-scale pulse sets, wherein said pulse width modulator is configured to select one of said plurality of different gray-scale pulse sets for controlling said light beam, and said combination of at least two pulses for one of said plurality of gray-scale pulses includes a left-positioned pulse and a right-positioned pulse;

wherein said pulse width modulator is configured to control said light beam to turn on and off in units of pixel by synthesizing said left-positioned pulse varying in a predetermined pulse pattern and said right-positioned pulse varying in an other predetermined pulse pattern.

35. The apparatus as defined in claim 34, wherein said pulse width modulator is configured to control the light beam to turn on and off at a rate corresponding to at least twice an image density of said input image data in a main scanning direction.

36. The apparatus as defined in claim 34, wherein said pulse width modulator is configured to control the light beam to turn on and off at a rate corresponding to at least twice an image density of said input image data in a sub-scanning direction.

37. The apparatus as defined in claim 34, wherein said pulse width modulator is configured to control the light beam to turn on and off at a rate corresponding to at least twice an image density of said input image data in both main scanning and sub-scanning directions.

38. The apparatus as defined in claim 34, further comprising:
an input mechanism configured to receive input information for predefining or changing the gray-scale pulses included in said plurality of gray-scale pulses of said gray-scale pulse set prestored in said modulation data storage device.

39. The apparatus as defined in claim 34,
wherein said pulse width modulator is configured to perform said pulse width modulation operation for said input image data of yellow, magenta, cyan, and black colors; and
wherein said optical writing mechanism is configured to form said latent image with yellow, magenta, cyan, and black colors on said photosensitive member in accordance with said input image data of yellow, magenta, cyan, and black colors, respectively, by causing said light beam to scan said photosensitive member, said light beam being controlled in accordance with said input image data of yellow, magenta, cyan, and black colors, respectively.

40. The apparatus as defined in claim 34, wherein
the pulse widths differ from each other in steps of a predetermined value, said predetermined value is a one-eighth of a pixel of said image data to be input.

41. An image forming apparatus, comprising:
a photosensitive member with a surface configured to receive a latent image corresponding to input image data;

an optical writing mechanism configured to scan a light beam on said photosensitive member to form said latent image;

a pulse width modulator configured to control said light beam based on said input image data, said light beam being controlled to turn on and off at a rate corresponding to at least twice an image density of said input image data; wherein said latent image is formed using a gray-scale pulse set which includes a plurality of gray-scale pulses of pulse widths which differ from each other, said plurality of gray-scale pulses each being formed from a combination of at least two pulses; and a storage memory configured to store a plurality of different gray-scale pulse sets, wherein said pulse width modulator is configured to select one of said plurality of different gray-scale pulse sets for controlling said light beam, and said combination of at least two pulses for one of said plurality of gray-scale pulses includes a right positioned pulse and another right-positioned pulse.

42. The image forming apparatus as defined in claim 41, further comprising:
a light beam source that includes light output at 650 nm wavelength.

43. The apparatus as defined in claim 41, wherein said pulse width modulator is configured to control the light beam to turn on and off at a rate corresponding to at least twice an image density of said input image data in a main scanning direction.

44. The apparatus as defined in claim 41, wherein said pulse width modulator is configured to control the light beam to turn on and off at a rate corresponding to at least twice an image density of said input image data in a sub-scanning direction.

45. The apparatus as defined in claim 41, wherein said pulse width modulator is configured to control the light beam to turn on and off at a rate corresponding to at least twice an image density of said input image data in both main scanning and sub-scanning directions.

46. The apparatus as defined in claim 41, further comprising:
an input mechanism configured to receive input information for predefining or changing the gray-scale pulses included in said plurality of gray-scale pulses of said gray-scale pulse set prestored in said modulation data storage device.

47. The apparatus as defined in claim 41,
wherein said pulse width modulator is configured to perform said pulse width modulation operation for said input image data of yellow, magenta, cyan, and black colors; and
wherein said optical writing mechanism is configured to form said latent image with yellow, magenta, cyan, and black colors on said photosensitive member in accordance with said input image data of yellow, magenta, cyan, and black colors, respectively, by causing said light beam to scan said photosensitive member, said light beam being controlled in accordance with said input image data of yellow, magenta, cyan, and black colors, respectively.

48. The apparatus as defined in claim 41, wherein
the pulse widths differ from each other in steps of a predetermined value, said predetermined value is a one-eighth of a pixel of said image data to be input.

* * * * *